US007572115B2

(12) United States Patent
Klein et al.

(10) Patent No.: US 7,572,115 B2
(45) **Date of Patent: *Aug. 11, 2009**

(54) CORROSION-RESISTANT ROTOR FOR A MAGNETIC-DRIVE CENTRIFUGAL PUMP

(75) Inventors: Manfred P. Klein, Highland Park, IL (US); Jeffrey S. Brown, Plainfield, IL (US); Scott A. McAloon, Oakbrook Terrace, IL (US); Peter E. Phelps, Darien, IL (US)

(73) Assignee: Innovative Mag-Drive, LLC, Chicago, IL (US)

(*) Notice: Subject to any disclaimer, the term of this patent is extended or adjusted under 35 U.S.C. 154(b) by 955 days.

This patent is subject to a terminal disclaimer.

(21) Appl. No.: 10/889,681

(22) Filed: Jul. 13, 2004

(65) Prior Publication Data

US 2005/0019182 A1 Jan. 27, 2005

Related U.S. Application Data

(63) Continuation-in-part of application No. 10/198,927, filed on Jul. 19, 2002, now Pat. No. 6,908,291.

(51) Int. Cl.
*F04B 17/00* (2006.01)
*F03D 11/02* (2006.01)

(52) U.S. Cl. ......................... 417/420; 464/29; 310/103; 310/104

(58) Field of Classification Search ................. 417/420; 310/103–105; 464/29
See application file for complete search history.

(56) References Cited

U.S. PATENT DOCUMENTS

| | | | | |
|---|---|---|---|---|
| 4,065,231 | A | 12/1977 | Litzenberg | 417/357 |
| 4,080,112 | A | 3/1978 | Zimmermann | 417/420 |
| 4,115,038 | A | 9/1978 | Litzenberg | 417/357 |
| 4,120,618 | A | 10/1978 | Klaus | 417/420 |
| 5,009,578 | A | 4/1991 | Hyland | 417/365 |
| 5,017,102 | A | 5/1991 | Shimaguchi et al. | 417/420 |
| 5,149,253 | A | 9/1992 | Miyamoto et al. | 417/353 |
| 5,253,986 | A | 10/1993 | Bond et al. | 417/420 |
| 5,269,664 | A | 12/1993 | Buse | 417/360 |
| 5,393,142 | A | 2/1995 | Meier | 366/274 |
| 5,470,152 | A | 11/1995 | Rains | 366/273 |
| 5,501,582 | A | 3/1996 | Gautier et al. | 417/420 |
| 5,505,594 | A | 4/1996 | Sheehan | 417/420 |
| 5,641,276 | A | 6/1997 | Heidelberg et al. | 417/423.7 |
| 5,659,214 | A | 8/1997 | Guardiani et al. | 310/87 |
| 5,674,057 | A | 10/1997 | Guardiani et al. | 417/423.3 |
| 5,779,449 | A | 7/1998 | Klein | 416/244 |
| 5,779,456 | A | 7/1998 | Bowes et al. | 417/420 |
| 5,895,203 | A | 4/1999 | Klein | 415/122.1 |
| 5,961,301 | A | 10/1999 | Wasserman et al. | 417/420 |
| 6,056,520 | A | 5/2000 | Nguyen et al. | 417/420 |
| 6,183,219 | B1 | 2/2001 | Nguyen | 417/420 |
| 6,264,440 | B1 | 7/2001 | Klein et al. | 417/420 |
| 6,417,591 | B1 | 7/2002 | Saito et al. | 310/104 |
| 6,908,291 | B2 * | 6/2005 | Klein et al. | 417/420 |

* cited by examiner

*Primary Examiner*—Charles G Freay

(57) ABSTRACT

A rotor for a magnetic-drive centrifugal pump includes a core for supporting a magnetic assembly of magnets. An inner barrier covers at least part of the magnets. The inner barrier hermetically isolates the magnetic assembly within the impeller. For example, in one embodiment the inner barrier may be sealed or hermetically connected to the core at one or more seams. An outer barrier overlies the inner barrier.

19 Claims, 20 Drawing Sheets

CORROSION-RESISTANT ROTOR FOR A MAGNETIC-DRIVE CENTRIFUGAL PUMP

This application is continuation-in-part of patent application Ser. No. 10/198,927, filed Jul. 19, 2002, now U.S. Pat. No. 6,908,291 and entitled CORROSION-RESISTANT IMPELLER FOR A MAGNETIC-DRIVE CENTRIFUGAL PUMP.

FIELD OF THE INVENTION

This invention relates to a corrosion-resistant rotor for a magnetic-drive centrifugal pump.

BACKGROUND

Magnetic-drive centrifugal pumps may be used to pump fluids, such as caustic and hazardous liquids. Instead of shaft seals, a magnetic-drive pump features a pump shaft separated from a drive shaft by a containment shell. The drive shaft is arranged to rotate with one magnetic assembly, which is magnetically coupled to another magnetic assembly. The magnetic assemblies cooperate to apply torque to the pump shaft to pump a fluid contained by the containment shell.

In a magnetic-drive centrifugal pump, the rotor is exposed to the pumped fluid. The magnetic assembly of the rotor may be encapsulated directly with a polymeric layer to protect the magnetic assembly from oxidation or corrosion by the pumped fluid. However, the polymeric layer is generally semi-permeable or sufficiently permeable to allow some of the pumped fluid (or constituents) to migrate through the polymeric layer to the magnetic assembly. Over time, one or more magnets of the magnetic assembly may be oxidized or corroded from exposure to the pumped fluid. When rust or other deposits form on a magnet, the properties of the magnet may change which may degrade performance of the pump in any of the following ways: (1) delamination of the polymeric layer from the magnet, (2) increased size of the magnet along with decreased axial clearance between the rotor and the pump interior, and (3) reduction in the magnitude of the magnetic field produced by the magnets. If a decrease in axial clearance is great enough, rubbing contact between the impeller and the pump interior may lead to failure of the pump. For example, the integrity of the containment shell may be compromised by mechanical scraping of the rotor or the pumped fluid may be contaminated by chemical interaction with an exposed portion of the magnetic assembly. If the magnetic coupling force is reduced by degradation of the rotor magnets, the pump may operate with reduced torque and lower pumping capacity. Thus, a need exists for improving the protection of the magnetic assembly of the rotor from the pumped fluid.

SUMMARY

In accordance with one aspect of the invention, a rotor for a magnetic-drive centrifugal pump comprises a core. The core supports a magnetic assembly of magnets. An inner barrier covers at least part of the magnets. The inner barrier hermetically isolates the magnetic assembly within the rotor. For example, in one embodiment the inner barrier may be sealed or hermetically connected to the core at one or more seams. An outer barrier overlies the inner barrier.

The outer barrier may vary in accordance with several possible configurations. In one embodiment, the outer barrier encapsulates the inner barrier so that the magnetic assembly is protected from the pumped fluid by a dual protective scheme. In another embodiment, the outer barrier is perforated with one or more openings such that the outer barrier at least partially encapsulates the inner barrier. If the outer barrier is semi-permeable or somewhat permeable, the openings prevent hydraulic pressure differentials from damaging or deforming the outer barrier during transient pump operating conditions. The corrosion-resistant rotor provides a reliable protective barrier that prevents or eliminates the ingress of pumped fluid that might otherwise attack the magnetic assembly of the rotor. Accordingly, the reliability and longevity of a pump may be enhanced by incorporation of the rotor into a magnetic-drive centrifugal pump.

BRIEF DESCRIPTION OF THE DRAWINGS

Like reference numbers in different drawings indicate like elements.

DETAILED DESCRIPTION

Figure 1:
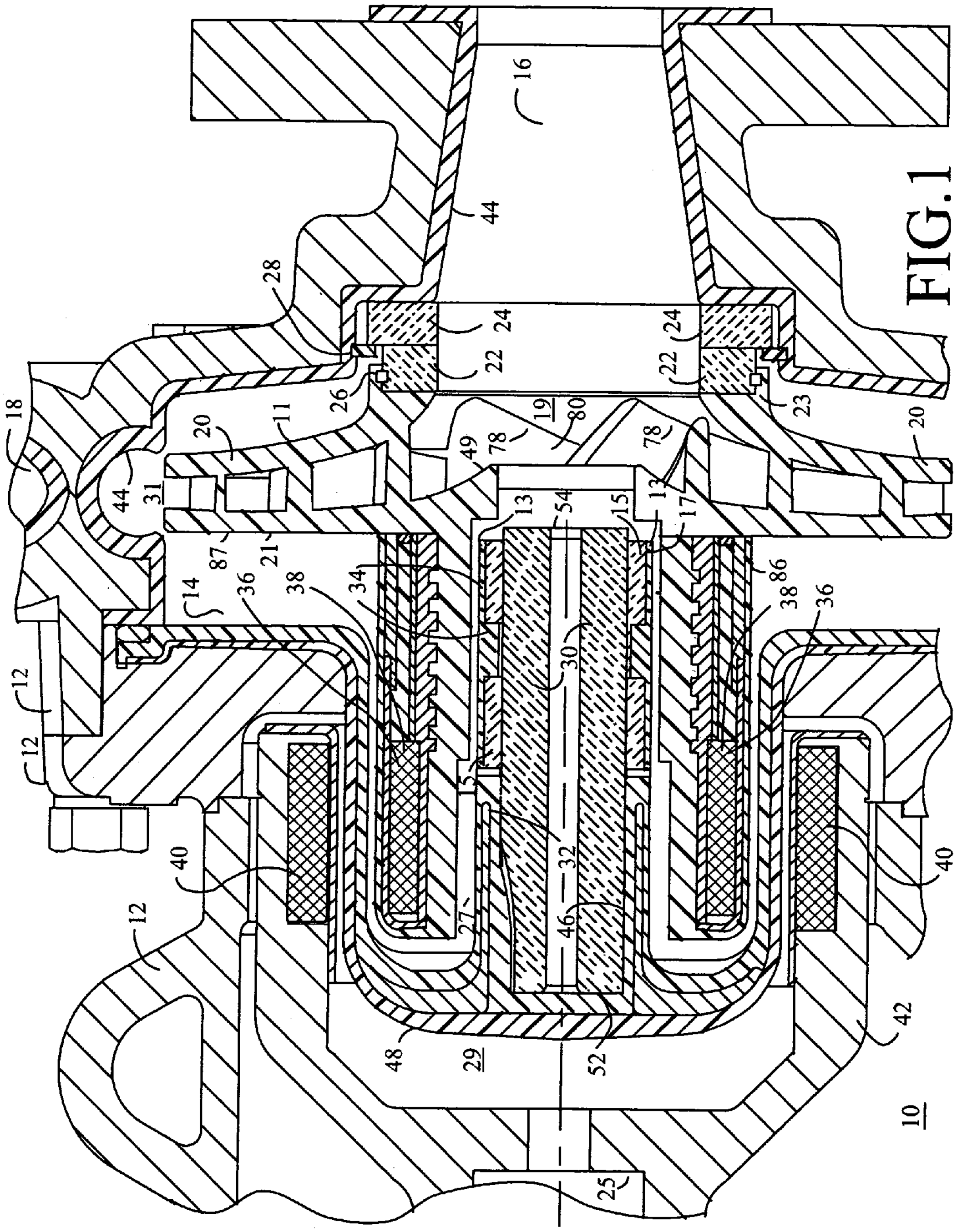
FIG. 1 is cross section of a centrifugal magnetic-drive pump in accordance with one embodiment of the invention.

In accordance with one embodiment of the invention, FIG. 1 illustrates a centrifugal pump 10. The centrifugal pump 10 includes a housing 12, a shaft 30, a radial bearing 34, and an impeller 20. The housing 12 has a housing cavity 14, an inlet 16, and an outlet 18. The housing 12 may be cast, molded, or otherwise formed by a group of housing sections which can be connected by fasteners, adhesives, or both. The housing cavity 14 is preferably lined with a corrosion-resistant material 44. A shaft 30 is located in the housing cavity 14. A radial bearing 34 coaxially surrounds the shaft 30. The shaft 30 and the radial bearing 34 are rotatable with respect to one another.

An impeller 20 is positioned to receive fluid from the inlet 16 and to exhaust fluid to the outlet 18 during rotation of the impeller 20. The impeller 20 receives the radial bearing 34.

FIG. 1 illustrates one configuration of a magnetic-drive pump 10 in which the shaft 30 is cantilevered. The shaft 30 has a first end 52 and a second end 54. In this embodiment, the first end 52 mates with a socket 46 in a containment member 48 or is otherwise mechanically supported by the containment member 48. The second end 54 is located near a hub 49 of the impeller 20. The shaft 30 of FIG. 1 is generally hollow or otherwise configured to reduce or eliminate the tendency of hydraulic forces to pull the shaft 30 out from the socket 46 in the containment member 48.

Although the shaft 30 is cantilevered, hollow, and stationary as shown in FIG. 1, various other shaft configurations are possible and fall within the scope of the invention. In a first alternate configuration, the shaft 30 is supported at multiple points, rather than being cantilevered. In a second alternate configuration, the shaft 30 is solid, instead of hollow. In a third alternate configuration, the shaft 30 is configured to rotate with respect to the housing 12 and one or more radial bearings associated with the shaft 30 may be stationary. Any features of the first, second and third alternate configurations may be combined to yield a solid shaft that rotates with respect to the housing, for example.

The shaft 30 is preferably composed of a ceramic material or a ceramic composite. In an alternate embodiment, the shaft 30 is composed of a stainless steel alloy or another alloy with comparable or superior corrosion-resistance and structural properties. In another alternate embodiment, the shaft 30 comprises a metal base coated with a ceramic coating or another hard surface treatment.

A wear ring assembly (22, 24) may be associated with the front side 11 of an impeller 20. The wear ring assembly (22, 24) includes a first wear ring 22 and a second wear ring 24. The first wear ring 22 is associated with the impeller 20 and the second wear ring 24 is associated with the housing 12 of the pump 10. The second wear ring 24 may be affixed to the housing cavity 14. The first wear ring 22 may be retained by a corresponding retainer 26 and the second wear ring 24 may be retained by a respective retainer 28. In one embodiment, the wear ring assembly (22, 24) may be composed of ceramic material because ceramic materials tend to hold their tolerances over their lifetime. In addition, smaller tolerances and clearances are possible with ceramic wear rings than for many metals, alloys, polymers, plastics and other materials that are also suitable for wear rings.

In one embodiment, the radial bearing 34 comprises a bushing 15 (e.g., ceramic bushing or carbon bushing) housed in a bearing retainer 13. For example, the bushing 15 may be composed of a ceramic material, such as silicon carbide. In an alternative embodiment, the radial bearing may comprise ceramic pads or carbon pads housed in a bearing retainer.

In one configuration, the radial bearing 34 is mated, interlocked, or otherwise mechanically joined with the impeller hub 49 to preferably define an opening (e.g., a series of spline-like openings) between the impeller hub 49 and the exterior 17 of the radial bearing 34. The opening allows pumped fluid to travel from the wear ring assembly (22, 24) around the back side of the impeller 20 through the hub 49 and back to the suction chamber 19. The suction chamber 19 is defined by the volume in the interior of the pump around the inlet 16 and the impeller eye 80.

The impeller 20 preferably comprises a closed impeller, although in other embodiments open impellers, or partially closed impellers may be used. The impeller 20 includes a front side 11 facing the inlet 16 and a back side 21 opposite the front side 11. For a closed impeller 20 as shown in FIG. 1, the front side 11 may be a generally annular surface that terminates in a flange 23. The back side 21 may include a generally cylindrical portion 86 and a generally annular surface 87 extending radially outward from the cylindrical portion 86. The impeller 20 includes blades 78 for propelling fluid outward from an impeller eye 80 (e.g., toward the outlet 18) during rotation of the impeller 20.

A first magnet assembly 38 is preferably associated with the impeller 20 such that the first magnet assembly 38 and the impeller 20 rotate simultaneously. The first magnet assembly 38 of magnets 36 may be integrated into the impeller 20 as shown in FIG. 1. A second magnet assembly 40 is carried by a outer rotor 42. A drive motor (not shown) is capable of rotating the drive shaft 25 and the outer rotor 42. The second magnet assembly 40 is oriented in magnetic communication with respect to the first magnet assembly 38. The magnetic assemblies (38, 40) support magnetic coupling between each other to permit the drive shaft 25 to transmit torque to the impeller 20 through the containment member 48.

The containment member 48 is oriented between the first magnet assembly 38 and the second magnet assembly 40. The containment member 48 may be sealed to the housing 12 to contain the pumped fluid within a wet-end 27 of the pump and to isolate the wet-end from a dry-end 29 of the pump.

The containment member 48 is preferably made of a dielectric in the region where the first magnetic assembly 38 and the second magnetic assembly 40 face one another. For example, the containment member 48 may be composed of one or more layers of a polymer, a plastic, a reinforced-polymer, a reinforced plastic, a plastic composite, a polymer composite, a ceramic, a ceramic composite, a reinforced ceramic or the like. Multiple dielectric layers may be used to add structural strength to the containment member 48 as illustrated in FIG. 1.

Although the containment member 48 includes a metallic reinforcement for structured support of the shaft 30, an alternate embodiment may delete the metallic reinforcement 48. Notwithstanding the foregoing composition of the containment member 48, alternate embodiments may use metallic fibers to reinforce the dielectric, a metallic containment shell instead of a dielectric one, or a single layer of dielectric instead of multiple layers.

The wear ring assembly (22, 24) defines a boundary between a suction chamber 19 and a discharge chamber 31 of the pump 10. A primary flow path of the pumped fluid extends between the inlet 16 and an outlet 18 of the pump. A secondary flow path of the pumped fluid extends from the discharge chamber 31 to the impeller hub 49 around the back 21 of the impeller 20. The secondary flow path is defined by the region between the containment member 48 and the impeller 20 and by the region between the impeller 20 and the shaft 30.

Figure 2:
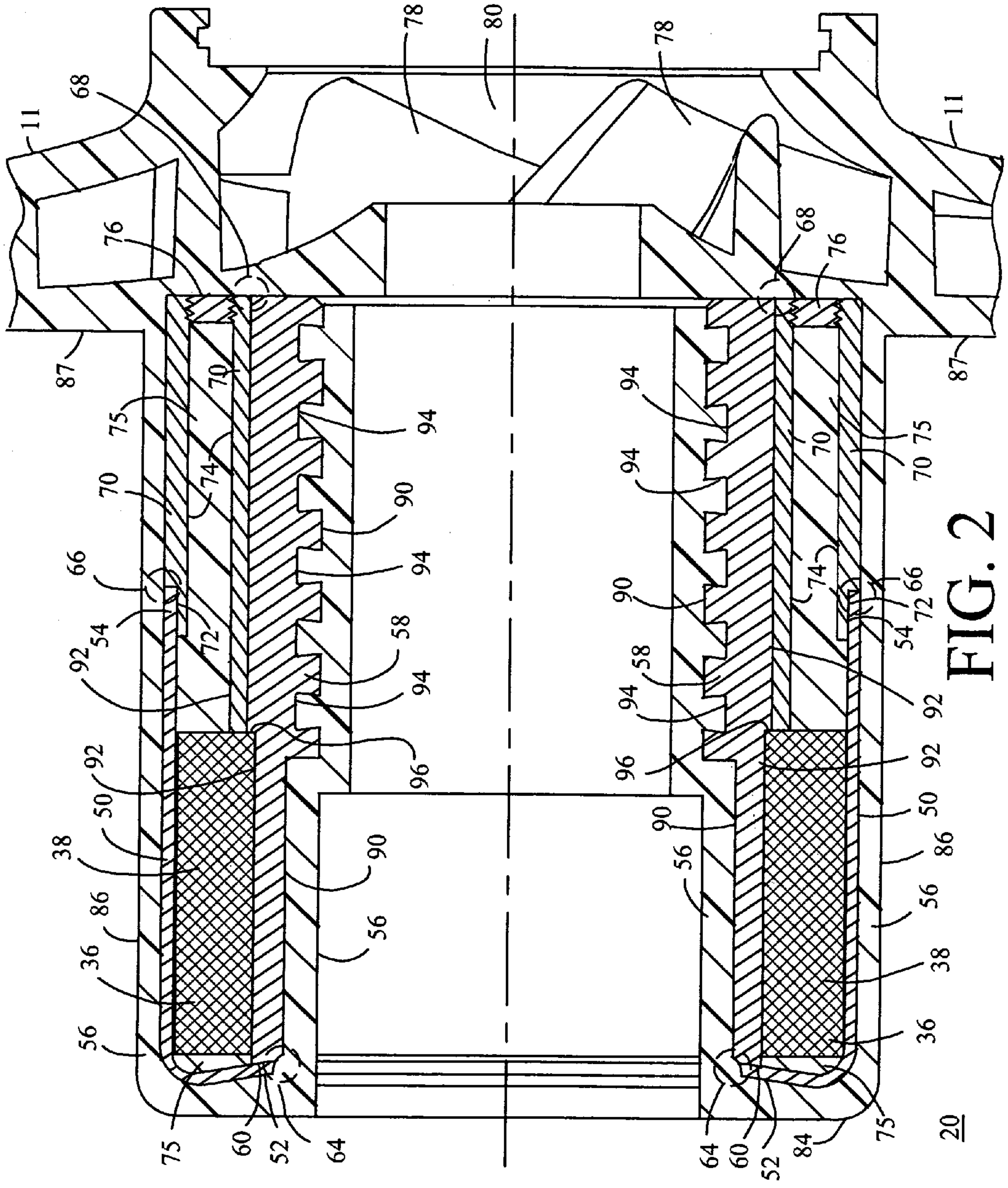
FIG. 2 is a cross-sectional view of an impeller of the pump of FIG. 1.

FIG. 2 shows an enlarged view of the impeller 20 of FIG. 1. Like reference numbers in FIG. 1, FIG. 2, and FIG. 3 indicate like elements. The impeller 20 for a magnetic-drive centrifugal pump (e.g., pump 10) includes a core 58. The core 58 supports the first magnet assembly 38. The magnets 36 of the first magnet assembly 38 are mounted about a periphery of the core 58. The core 58 may be composed of metallic material (e.g., a ferrous alloy or metal). An inner barrier 50, for fluidic isolation of the first magnetic assembly 38 from the pumped fluid, covers at least part of the magnets 36. The inner barrier 50 is sealed or hermetically connected (e.g., welded) to the core 58 at one or more seams (e.g., a first seam 64). Hermetically connected or sealed means that the inner barrier 50 is sealed to another part of the impeller (e.g., impeller 20) by welding, fusion, soldering, brazing, or another bonding technique to prevent fluid (e.g., the pumped fluid), liquid, gas, or air from traversing the inner barrier 50 into its interior volume. The magnets 36 are disposed in the interior volume between the inner barrier 50 and the core 58. An outer barrier 56 overlies the inner barrier 50. In this embodiment, the outer barrier 56 encapsulates the inner barrier 50 and the first magnetic assembly 38 is protected from the pumped fluid by two protective layers. The outer barrier 56 preferably surrounds the inner barrier 50 and at least a portion of the core 58. Although the outer barrier 56 preferably comprises a polymeric layer and the inner barrier 50 comprises a metallic barrier or shield, other materials may be used for the inner barrier 50 and the outer barrier 56.

In one embodiment, the core 58 has a generally cylindrical exterior surface 92 and a generally cylindrical interior surface 90. The magnets 36 are spaced apart in a loop around the cylindrical exterior surface 92 of the core 58. The spatial volume between the magnets 36 may define cavities within the impeller 20. The cavities may be referred to collectively as the interior volume. The cylindrical exterior surface 92 may have a step 96 or another feature to facilitate proper alignment of the magnets 36 at radial intervals about the generally cylindrical exterior surface 92. In one embodiment, a sleeve 70 may engage at least a portion of the cylindrical exterior surface 92 of the core 58. The sleeve 70 may be composed of a metallic material (e.g., a non-ferrous alloy or metal). In one embodiment, the cylindrical interior surface 90 may have channels 94 (e.g., generally annular channels) or another surface variation to promote adhesion of the outer barrier 56 to the cylindrical interior surface 90 of the core 58.

In an alternate embodiment, the channels 94 may be deleted so that that cylindrical interior surface 90 is curved and generally cylindrical.

The inner barrier 50 hermetically isolates the first magnetic assembly 38 from any pumped fluid that might otherwise traverse or permeate the outer barrier 56. Hermetic isolation means that the inner barrier 50 is airtight, liquid-tight, or both. The hermetic isolation is provided by a hermetic connection or seal that is generally resistant to chemical and physical properties of the pumped fluid to keep the magnets 36 of the first magnetic assembly 38 dry and free of pumped fluid.

The inner barrier 50 forms at least one wall of a container that contains the magnets 36. Another part of the impeller may form additional walls of the container for containing the magnets 36. As shown in FIG. 2, the inner barrier 50 may have a generally hollow cylindrical shape that terminates in a generally orthogonal angle at one end. Accordingly, the inner barrier 50 may be shaped like a generally cylindrical cup with a hole in its bottom and without a handle.

The inner barrier 50 may be formed in any of the following illustrative techniques. In accordance with a first construction technique, the inner barrier 50 may be stamped from metallic sheet stock. In accordance with a second technique, the inner barrier 50 may be formed from an extruded cylindrical portion with an end ring attached (e.g., welded) to one end of the cylindrical portion. In accordance with a third technique, the inner barrier 50 may be formed of sheet stock that is rolled and welded along a longitudinal seam to form a cylindrical portion. An end ring or washer is attached (e.g., welded) to one end of the cylindrical portion to form the inner barrier 50. Other techniques for forming the inner barrier 50 might include casting, bending, machining or other metallurgical fabrication processes.

The inner barrier 50 has a first end 52 and a second end 54. The first end 52 of the inner barrier 50 adjoins a core rear 60 of the core 58. The first end 52 of the inner barrier 50 is sealed or hermetically connected (e.g., welded) to the core 58 at a first seam 64. The first seam 64 is indicated by the dashed circle associate with reference numeral 64. In the configuration of FIG. 2, the sleeve 70 has a step 72 or a channel that engages a second end 54 of the inner barrier 50, although other joint configurations are possible (e.g., butt joint and lap joint). The second end 54 of the inner barrier 50 is sealed or hermetically connected (e.g., welded) to the sleeve 70 at a second seam 66. The second seam 66 is indicated by a dashed circle associated with the reference numeral 66.

Figure 3:
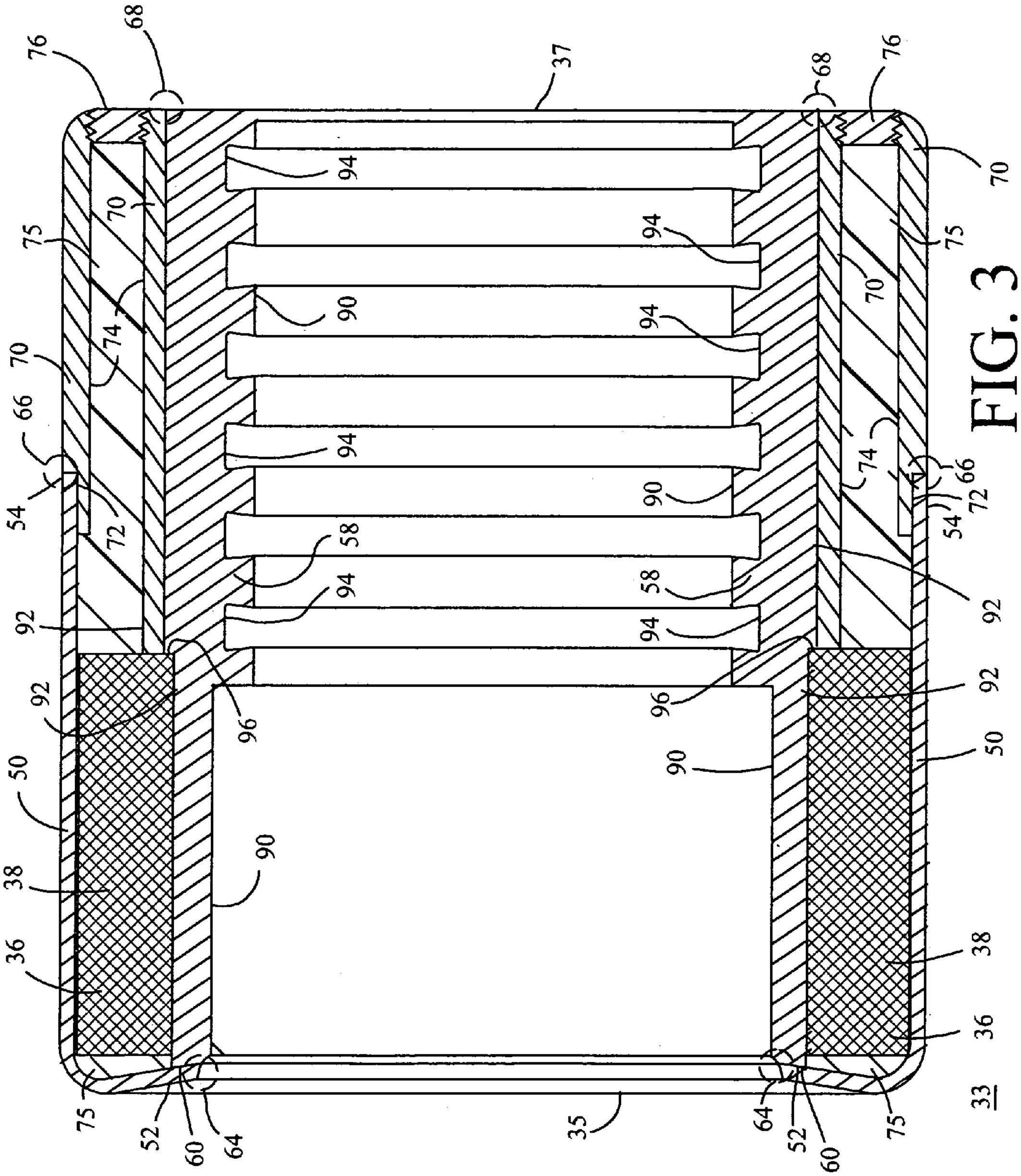
FIG. 3 is an internal section of the impeller of FIG. 2 prior to the formation of an outer polymeric structure.

In the embodiment of FIG. 1, FIG. 2 and FIG. 3, the impeller 20 has three seams that are sealed with respect to fluid or hermetically interconnected. The first seam 64 is located at the junction of the inner barrier 50 and the core 58. In the embodiment of FIG. 1, FIG. 2 and FIG. 3, the first seam 64 is disposed near or at the core rear 60; the first seam 64 follows a generally circular path around a rear 35 (FIG. 3) of the internal impeller section 33 (FIG. 3). The second seam 66 is located near or at the junction of the inner barrier 50 and the sleeve 70. The second seam 66 follows a generally annular path around a cylindrical portion 86 of the impeller 20. A third seam 68 is located at the junction of the core 58 and the sleeve 70. In the embodiment of FIG. 1, FIG. 2, and FIG. 3, the third seam 68 is disposed at or near a front 37 (FIG. 3) of the internal impeller section 33 (FIG. 3); the third seam 68 follows a generally annular path around a front 37 of the internal impeller section 33.

The sealing or hermetic interconnection of each seam may be made according to several different techniques. Under a first technique, the sealing or hermetic interconnection is made by welding adjoining metallic components or by fusing adjoining metallic components with the application of heat, pressure, or both. Under a second technique, the sealing or hermetic interconnection is made by brazing adjoining metallic components. Under a third technique, the sealing or hermetic interconnection is made by soldering adjoining metallic components. Advantageously, the hermetic interconnection of the first through the third techniques may be formed of non-permeable materials (e.g., metals or alloys) that prevent the flow or passage of the pumped fluid or any gas within the pumped fluid through the hermetic interconnection. The hermetic interconnection of the first through the third techniques is not formed of semi-permeable materials (e.g., adhesives, elastomers or polymers) that may allow diffusion or penetration of the pumped fluid or constituent components (e.g., any gas, solvent, or volatile organic compound) of the pumped fluid. Under a fourth technique, the sealing or hermetic interconnection is made by a mechanical fasteners (e.g., rivots or threads) or a mechanical connection (e.g., a snap-fit connector). Under a fifth technique, the sealing or hermetic interconnection is made by a seal (e.g., a gasket, an elastomeric member, or an elastomeric O-ring) that adjoins adjacent components of similar or different composition. The seal cooperates with mechanical connection that fastens or secures adjacent components of similar or different composition. Under a seventh technique, the third seam may be formed by a compressive fit between the sleeve and the core, a threaded connection between the sleeve and the core, by a seal, or any combination of the foregoing items.

The first, second, and third seams (64, 66 and 68) provide isolation (e.g., hermetic isolation) of the magnets 36 (e.g., the first magnetic assembly 38) from the deleterious effects of exposure to pumped fluid. In particular, the inner barrier 50, the core 58 the sleeve 70, and their associated seams (64, 66, and 68) cooperate to form an inner protective container for preventing the oxidation and corrosion of the magnets 36 (e.g., the first magnetic assembly 38) within the impeller 20. The inner protective container represents a hermetically sealed chamber for protection of the first magnetic assembly 38.

In one or more embodiments, the volume around the magnets 36 of the impeller 20 may be filled with a filler 75 (e.g., a corrosion-inhibiting filler or a polymer) via a bore 74 in sleeve 70. The bore 74 may be sealed with a corresponding cap 76.

In an alternate embodiment, the volume around the magnets 36 may be configured as an air cavity that is not filled with a filler 75 and capped with cap 76, where the air cavity is consistent with the manufacturing techniques employed in fabrication of the impeller.

The outer barrier 56 overlies the inner barrier 50 and may encapsulate the entire internal impeller section 33 to form an outer protective container. The outer protective container may prevent or inhibit oxidation or corrosion of the magnets 36 of the impeller 20. The outer protective container protects the inner protective container and the magnets 36 from the pumped fluid. Even if the pumped fluid breaches the outer protective container, the inner protective container prevents the pumped fluid from contacting, corroding, or chemically attacking the first magnet assembly 38. Together, the inner protective container and the outer protective container provide a highly reliable, dual protection against the ingress of pumped fluid that might otherwise chemically attack or corrode the magnets 36. Accordingly, the impeller (e.g., impeller 20 of FIG. 2) has at least two protective containers to protect the first magnet assembly 38 from the physical and chemical properties of the pumped fluid.

In one embodiment, the outer barrier 56 may be composed of polymer (e.g., a corrosion-resistant polymer). Suitable corrosion-resistant polymers for the outer barrier 56 include epoxy and vinyl ester resin, for example. FIG. 3 shows an internal section of the impeller 20 prior to formation of the outer barrier 56. FIG. 2 shows the impeller 20 after the formation of the outer barrier 56 of a polymer.

In an alternate embodiment, the outer barrier 56 is composed of a polymeric matrix and a reinforcing material distributed within the polymeric matrix. For example, the outer layer may be composed of a polymer composite, a plastic composite, a fiber-reinforced plastic, a fiber-reinforced polymer, carbon fiber-filled polytetrafluoroethylene (PTFE), or another structurally suitable composition. The polymeric matrix may comprise a polymer or plastic, such as PTFE or ethylene tetrafluoroethylene (ETFE). The reinforcing material may comprise carbon fiber, ceramic, metal fiber, glass fiber, or another suitable structural-enhancing filler.

The inner barrier 50, the core 58, and the sleeve 70 may be constructed of a corrosion-resistant metal, a corrosion-resistant alloy, or any metal or alloy that is compatible with or resistant to corrosion or unwanted chemical reaction with the pumped fluid. In one embodiment, the inner barrier 50, the core 58 and the sleeve 70 are preferably constructed from the substantially similar metals or alloys to facilitate welding, fusing, or brazing of the inner barrier 50, the core 58 and the sleeve 70 at the first seam 64, the second seam 66 and the third seam 68. Use of the same or substantially similar metals or alloys for the inner barrier 50, the core 58, and sleeve 70 may serve to maximize the compatibility of the impeller 20 with a wide assortment of pumped fluids. For example, the core 58, the sleeve 70, and the inner barrier 50 may be composed of stainless steel.

In one embodiment, the inner barrier 50 is composed of 304L low carbon stainless steel or 316 low carbon stainless steel. When 304L stainless or 316 stainless steel are welded less carbides are formed than with some other stainless alloys. Carbides are less corrosion resistant than the stainless steel itself In an alternate embodiment, the core 58, the inner barrier 50, or both may be composed of HASTELLOY for corrosion resistance to a particular pumped fluid. HASTELLOY metal alloy is a registered trademark of Haynes International, Inc. of Kokomo, Indiana.

In another alternate embodiment, the core 58 is composed of carbon steel, ductile iron, or another ferrous alloy to provide a desired level of torque transfer between the first magnet assembly 38 and the second magnet assembly 40.

FIG. 3 illustrates the internal impeller section 33. The internal impeller section 33 has a font side 37 and a back side 35. Like reference numerals in FIG. 1, FIG. 2, and FIG. 3 indicate like elements.

Figure 4:
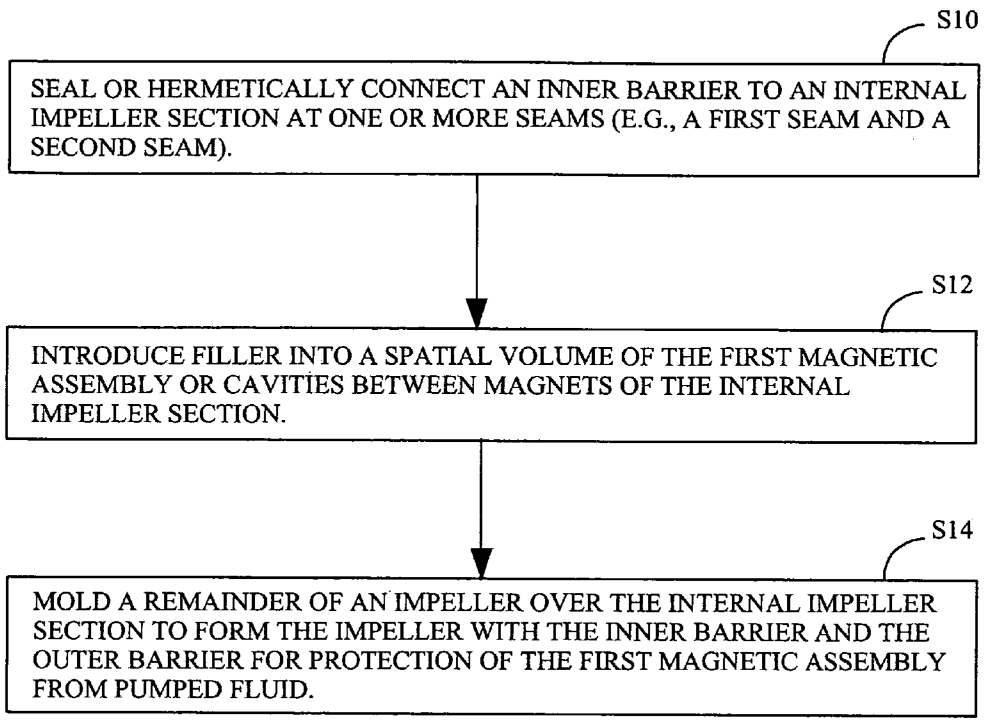
FIG. 4 is a flow chart of a method for making an impeller in accordance with one embodiment of the invention.

FIG. 4 is a flow chart of a method for fabricating an embodiment of an impeller (e.g., impeller 20) in accordance with the invention. The method of FIG. 4 begins in step S10.

In step S10, the inner barrier 50 is sealed or hermetically connected to an internal impeller section (e.g., internal impeller section 33) at one or more seams. The internal impeller section 33 may have any number of seams that are necessary to form an inner protective container for the magnets 36. The number of seams vary in accordance with several alternate embodiments. In a first embodiment, the inner barrier 50 is sealed or hermetically connected to the core 56 at the first seam 64; the inner barrier 50 is sealed or hermetically connected to the sleeve 70 at the second seam 66; and the sleeve 70 is sealed or hermetically connected to the core 58 at the third seam 68.

In a second embodiment, only two seams are present if the core and the sleeve are integrated into a single unit. The single unit may be referred to as a unitary core which replaces the core 56 and the sleeve 70. Accordingly, the inner barrier 50 is sealed or hermetically connected to the unitary core at a first seam and the inner barrier 50 is sealed or hermetically connected to the core at a secondary seam (e.g., secondary seam 166 of FIG. 9 or FIG. 10). Although welding or fusion is preferably used to form the seal or hermetic connection of the seams (e.g., the first seam 64, the second seam 66, and the third seam 68), other techniques may be used to form the seal or hermetic connection of the seams.

Welding is generally preferred to brazing so as to reduce the number of metallic compounds used in the pump to prevent unwanted chemical interaction with a wide array of pumped fluids or specific pumped fluids. Suitable welding techniques include, but are not limited to, laser welding and gas-tungsten-arc welding. Laser welding can be completed in the presence of the magnets 36 and the quality of the weld is not generally affected by the magnetic field. Because laser welding is susceptible to contamination on the surfaces to be welded, the surfaces should be cleaned by a solvent, a detergent, or otherwise mechanically scrubbed prior to laser welding. Gas-tungsten-arc welding provides a highly localized heat source that prevents damage to the magnets 36.

Other welding techniques that may be employed include any of the following: MIG welding, TIG welding, electron beam welding, resistance welding, spin welding, and friction welding. MIG welding comprises gas metal arc welding where wire or other weld material is continuously fed. TIG welding comprises gas tungsten arc welding where an arc is formed between a permanent tungsten electrode and the metal welded. Argon gas or mixtures of argon and helium gas may be used as a shielding gas during MIG welding or TIG welding to shield and stabilize the arc from the effects of ambient air. Electron beam welding heats and fuses metal at a weld joint by impinging a beam of high energy electrons on the desired weld joint. In general, filler material is not required for electron beam welding and hermetic seals may be readily achieved, but X-rays are produced during the welding process. Resistance welding applies electric current and mechanical pressure to make a connection between two metal components. In spin welding, a stationary part is joined to a rotating part as compressive force is applied to force the stationary part and the rotating part toward each other such that friction heats the mating edges to fuse together. Spin welding is well suited for making air-tight welds for cylindrical or circular products. Friction welding rubs two components together at a controlled rotational velocity to create friction and heat that causes the components to fuse together. Titanium, alloys, and high-carbon steel may be friction welded. Friction welding is well-suited for creating an air-tight weld.

In step S12, after welding or other heat is applied to form the seal or hermetic connection of the inner barrier 50, filler 75 (e.g., a corrosion inhibitor or a corrosion-resistant filler) may be introduced into the spatial volume or cavities between the magnets 36 of the internal impeller section 33. For example, filler 75 may be injected, poured, or otherwise introduced into the spatial volume or cavities between the magnets 36 of the first magnetic assembly 38 via one or more bores 74 in the sleeve 70. The filler 75 inhibits or prevents corrosion of the magnets 36 in the first magnetic assembly 38. The bore 74 may be filled with the filler 75 and optionally capped with a plug 76. In one embodiment, the bore 74 and the plug 76 have corresponding threads adapted for rotational engagement. The internal impeller section 33 is illustrated in FIG. 3 after the bore 74 is filled with filler 75 and capped with a plug 76.

In an alternate embodiment, the plugs and the respective bores may not be threaded (e.g., a press-fit may be used instead) or the respective bores may be welded shut by using the plugs as welding material or otherwise.

The filler may be used to protect the magnets 36 from oxidation and corrosion from moisture or pumped fluid that somehow traverses other protective barriers to the magnets 36 within the impeller (e.g., impeller 20). After hardening or containment, the filler 75 (e.g., hardened or cross-linked polymeric filler) prevents the inner barrier 50 from being crushed if the exterior of the impeller (e.g., impeller 20) is formed by injection molding over the internal impeller section 33. Injection molding includes compression molding, injection-compression molding, and other related techniques.

If the corrosion-resistant filler comprises a polymeric material, the filler may be composed of one or more of the following: an elastomer, a potting compound, an epoxy, silicone, or a thermoset plastic. The filler preferably has an uncured liquid state that supports pouring, injection or forced injection of the filler into cavities or other hollow volumes within the impeller (e.g., impeller 20) or internal impeller section 33. For example, thermoset plastic may be poured and later hardens by cross-linking.

In step S14, an outer barrier 56 and a remainder of the impeller is molded over the internal impeller section 33 of FIG. 3 to form the remainder of the impeller (e.g., impeller 20). For example, the resultant impeller 20 of FIG. 2 may be formed by molding over the internal impeller section 33 of FIG. 3. The remainder of the impeller 20 includes the impeller blades 78, impeller eye 80, and hub 49, and recess in flange 23 for the first wear ring 22. In FIG. 2, the polymeric structure adjacent to the front side 37 (FIG. 3) of the internal impeller section 33 (FIG. 3) represents a front portion of the outer barrier 56 or the remainder of the impeller 20. FIG. 2 illustrates the internal impeller section 33 plus the remainder of the impeller 20. Although FIG. 2 shows a closed impeller, other impeller configurations are possible, such as an open or partially closed impeller.

The outer barrier 56 of the impeller 20 and the remainder of the impeller 20 is preferably composed of a polymer. For example, the outer barrier 56 may be composed of a fluoropolymer, such as TEFZEL, a fluorine-containing polymer. TEFZEL is a registered trademark of E. I. Du Pont de Nemours and Company of Wilmington, Del.

Step S14 is preferably carried out by a high-pressure molding process, injection molding, injection-compression molding, or compression molding. However, under an alternate procedure, the exterior of the impeller 20 may be formed by lower pressure techniques in step S14, such as resin-transfer molding or fiberglass molding techniques. Accordingly, if low-pressure molding techniques are used, the introduction of the filler 75 in step S12 is not required for structural support during the molding of step S14, but may still be used to inhibit or prevent corrosion of the magnets 36.

In one example of a low-pressure molding technique, a drive assembly of an impeller is inserted into a preformed section of the impeller that may be molded in accordance with any suitable technique. For instance, the drive assembly or impeller interior portion 33 of FIG. 3 may be slid into a pocket that forms a remainder of the impeller 20 of FIG. 2, except for an opening. The opening may be closed by the formation of a polymeric cap (e.g., thermal processing or welding of a polymeric cap onto the pocket at the rear of the impeller 20). The combination pocket and the polymer cap hermetically seals the internal impeller 20 assembly within a polymeric shell.

Figure 5:
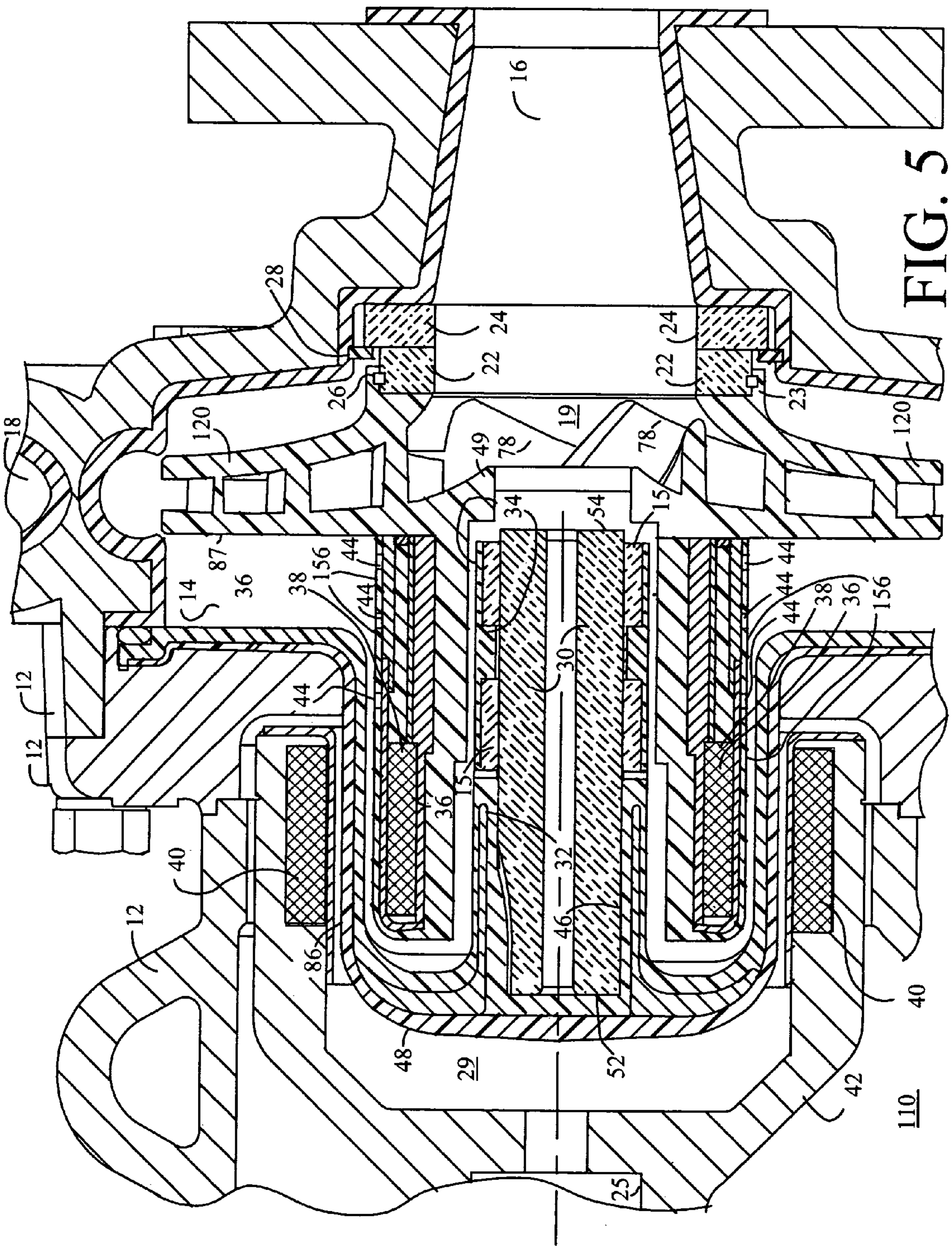
FIG. 5 is a cross section of another embodiment of a centrifugal magnetic-drive pump.

FIG. 5 shows an alternate embodiment of a pump 110 with an alternate impeller 120. The pump of FIG. 5 is similar to the pump of FIG. 1 except the impeller 120 of FIG. 5 features openings 44 in the outer barrier 156. Like reference numbers in FIG. 1 and FIG. 5 indicate like elements.

In the embodiment of FIG. 5, if the outer barrier 156 is sufficiently perforated with one or more openings 44, the pumped fluid readily exits from the interior of the outer barrier 156 when the impeller 120 stops rotating. The pumped fluid might otherwise be trapped in the interior of the outer barrier 156 in a manner that deforms the outer barrier 156 if the outer barrier 156 is permeable or semi-permeable (e.g., certain polymers are permeable and semi-permeable). When the impeller 120 stops rotating, the hydraulic pressure of the fluid around the impeller 120 decreases, while the hydraulic forces experienced by the outer barrier 156 readily decrease to equilibrium through venting of the openings 44 in the outer barrier 156. Accordingly, the openings 44 reduce or prevent the formation any hydraulic pressure gradient within an outer barrier 156 that is not impermeable. The prevention of the formation of the hydraulic pressure gradients prevents delamination of the outer barrier 156 and deformation or bulging of the outer barrier 156. The openings 44 may relieve pressure that might otherwise build up between the inner internal impeller section 33 and the outer barrier 156. The configuration of the pump 110 of FIG. 5 is well suited for operating under transient (e.g., stopping and starting) or high-pressure conditions.

Figure 6:
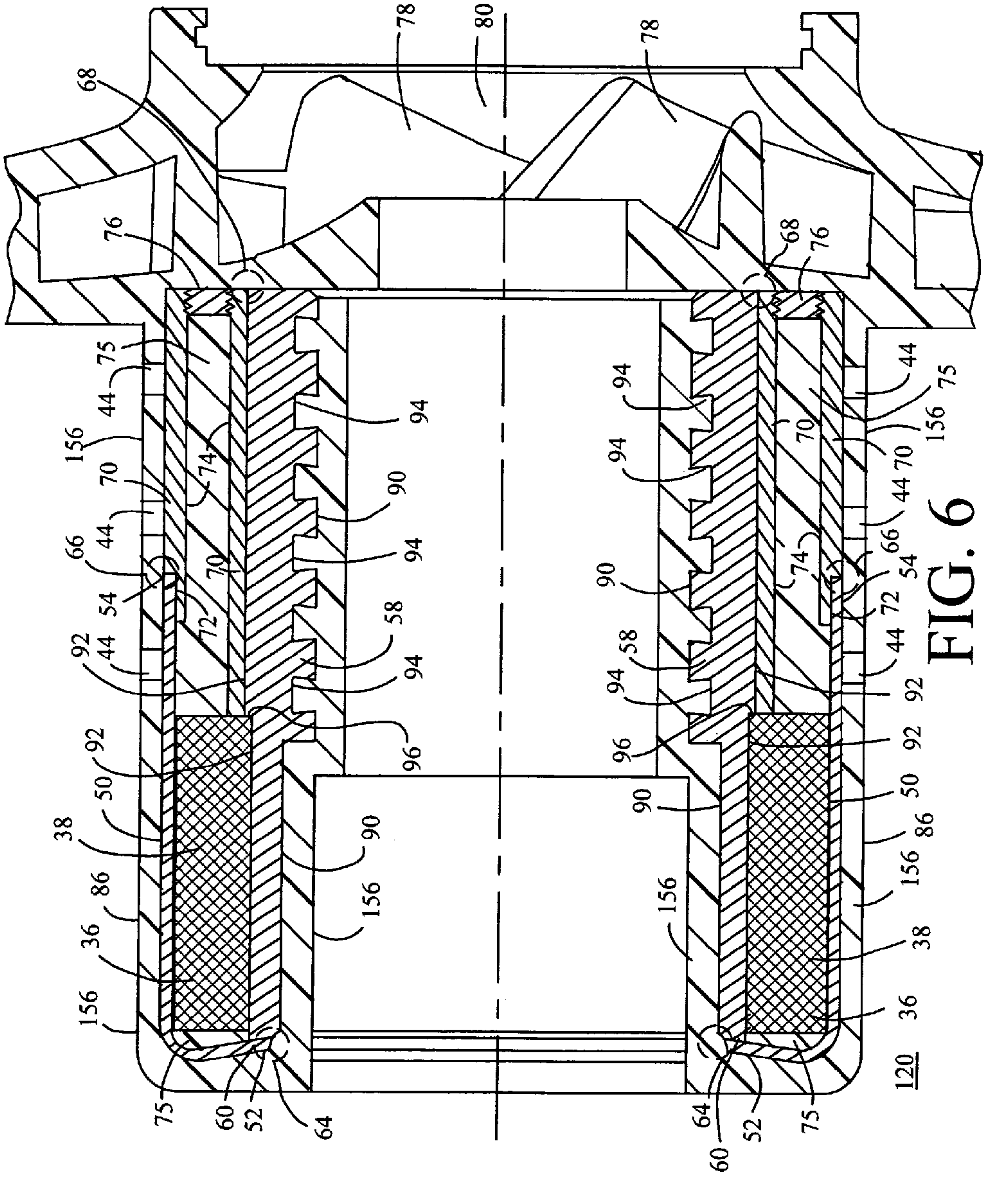
FIG. 6 is a cross-sectional view of an impeller of FIG. 4.

FIG. 6 shows an enlarged version of the impeller 120 of FIG. 5. The impeller 120 features openings 44 in the outer barrier 156 as previously described in conjunction with FIG. 5. The impeller 120 of FIG. 6 is similar to the impeller 20 of FIG. 2 except for the openings 44. Like reference numbers in FIG. 2 and FIG. 6 indicate like elements.

Figure 7:
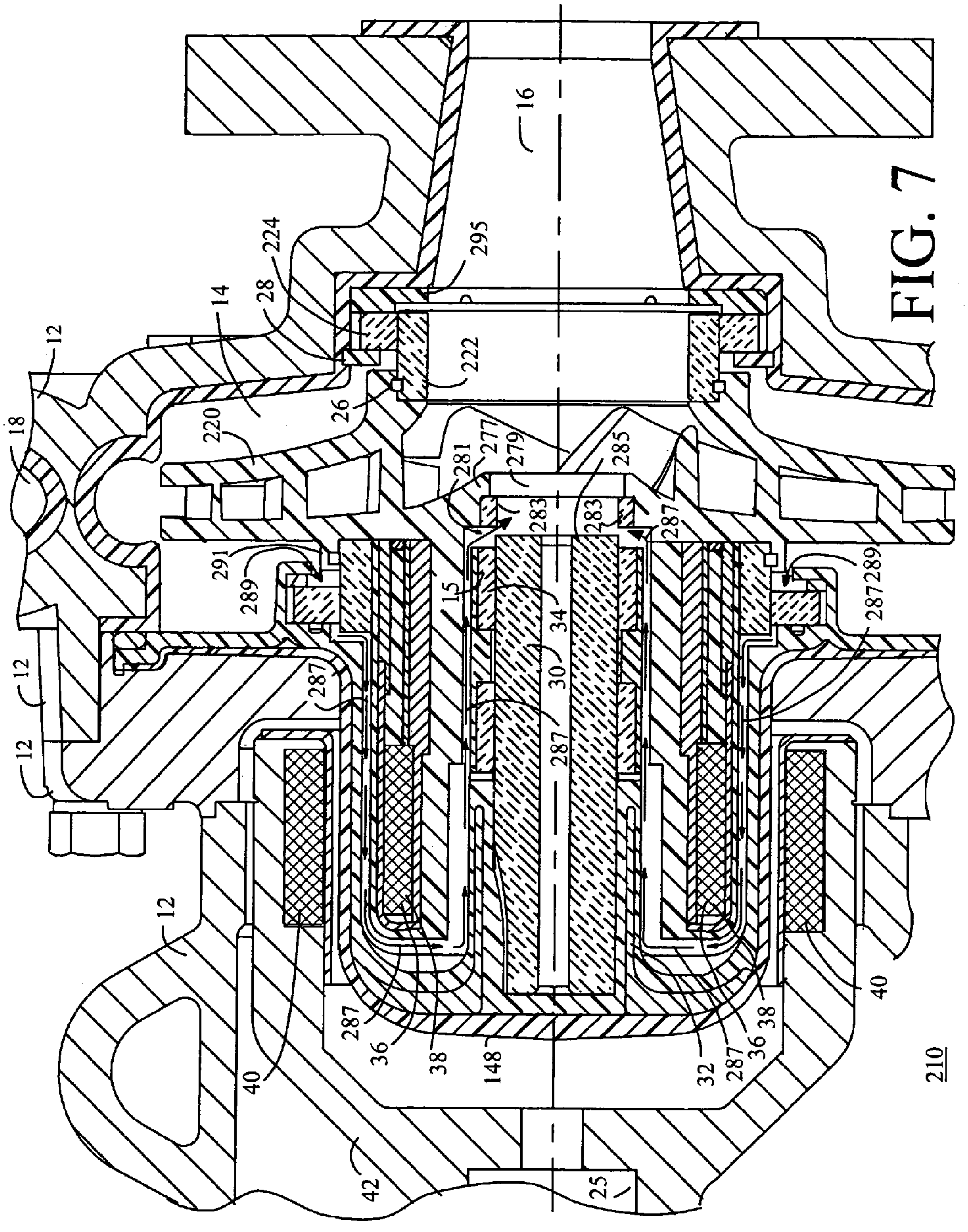
FIG. 7 is a cross section of another embodiment of a centrifugal magnetic-drive pump having a thrust balancing system.

FIG. 7 shows a pump 210 having a thrust balancing system and incorporating an embodiment of a corrosion-resistant impeller 220. The impeller of FIG. 7 is similar to the impeller of FIG. 1 except for the flange 291 for the rear wear ring assembly 289 and impeller hub 277 that accommodates ring 283. Like reference numbers indicate like elements in FIG. 1 and FIG. 7.

The impeller 220 includes an impeller hub 277 with an opening 279 and an impeller recess for receiving the radial bearing 34. A thrust balancing valve 281 comprises a combination of a ring 283 and an end 285 of the shaft 30. The thrust balancing valve 281 is associated with the hub 277 to define a variable orifice for fluidic communication between a secondary flow path 287 and the inlet 16. The pump 220 preferably includes a front wear ring assembly (222, 224) and a rear wear ring assembly (289) with axially extended rings which permit the thrust balancing system to operate at an axial position within a range of axial positions, based upon the operating point of the pump 220 and the specific gravity of the pumped fluid. The range of axial positions may range between a forward limit and a rear limit. At the forward limit the first wear ring 222 contacts a thrust bearing 295. At the rear limit the shaft end 285 contacts the thrust balancing ring 283 of the variable orifice. The containment member 148 has a flange for supporting the rear wear ring assembly 289.

Figure 8:
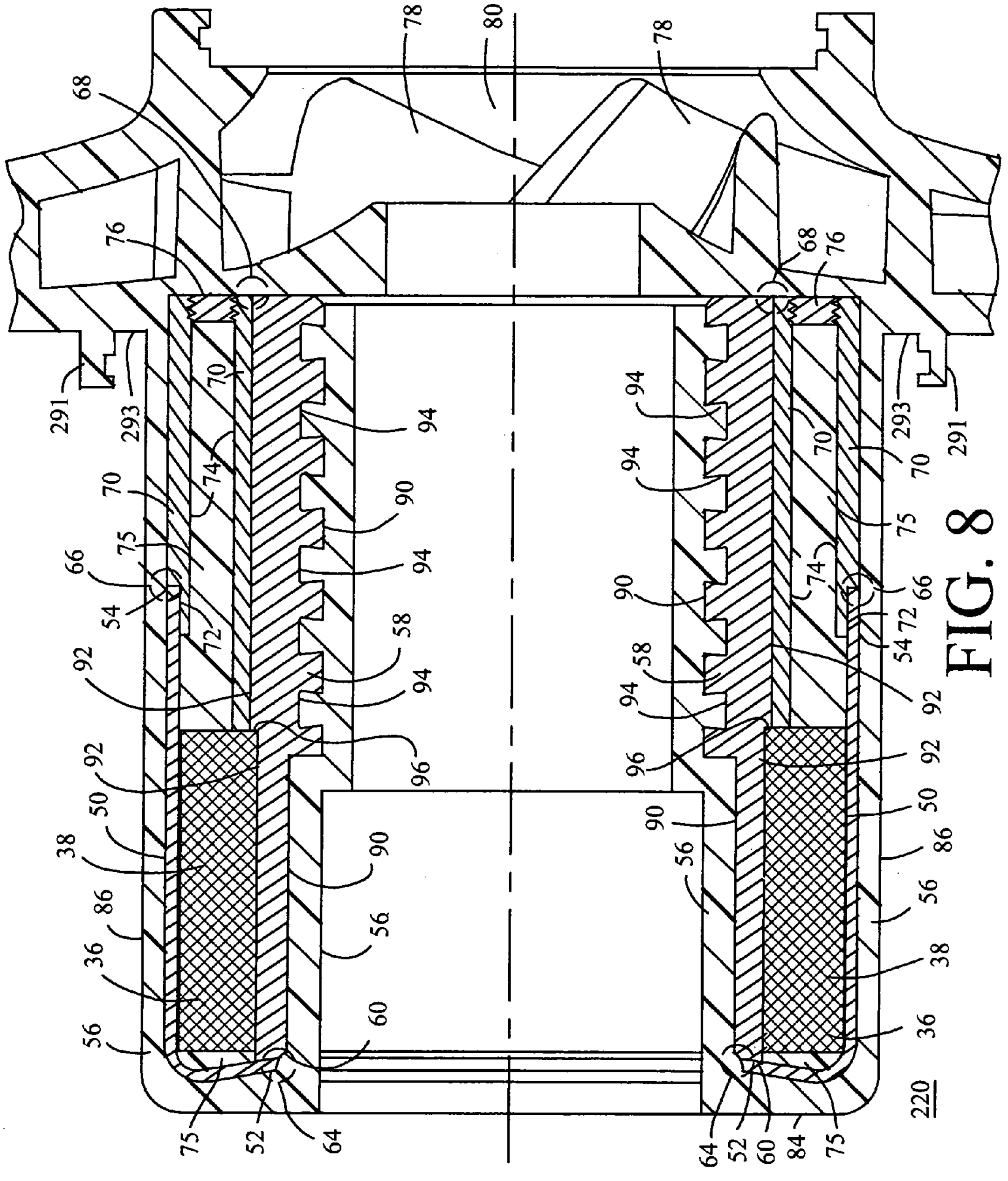
FIG. 8 is a cross-sectional view of an impeller of FIG. 7.

FIG. 8 shows an enlarged version of the impeller 220 of FIG. 7. The impeller 220 of FIG. 8 is similar to the impeller 20 of FIG. 2 except the impeller 220 of FIG. 8 includes the impeller hub 277 and a flange 291 for supporting a rear wear ring of the wear ring assembly 289. The flange 291 has a recess 293 for accepting a retainer for retaining a rear wear ring. Like reference numbers in FIG. 2 and FIG. 8 represent like elements.

Figure 9:
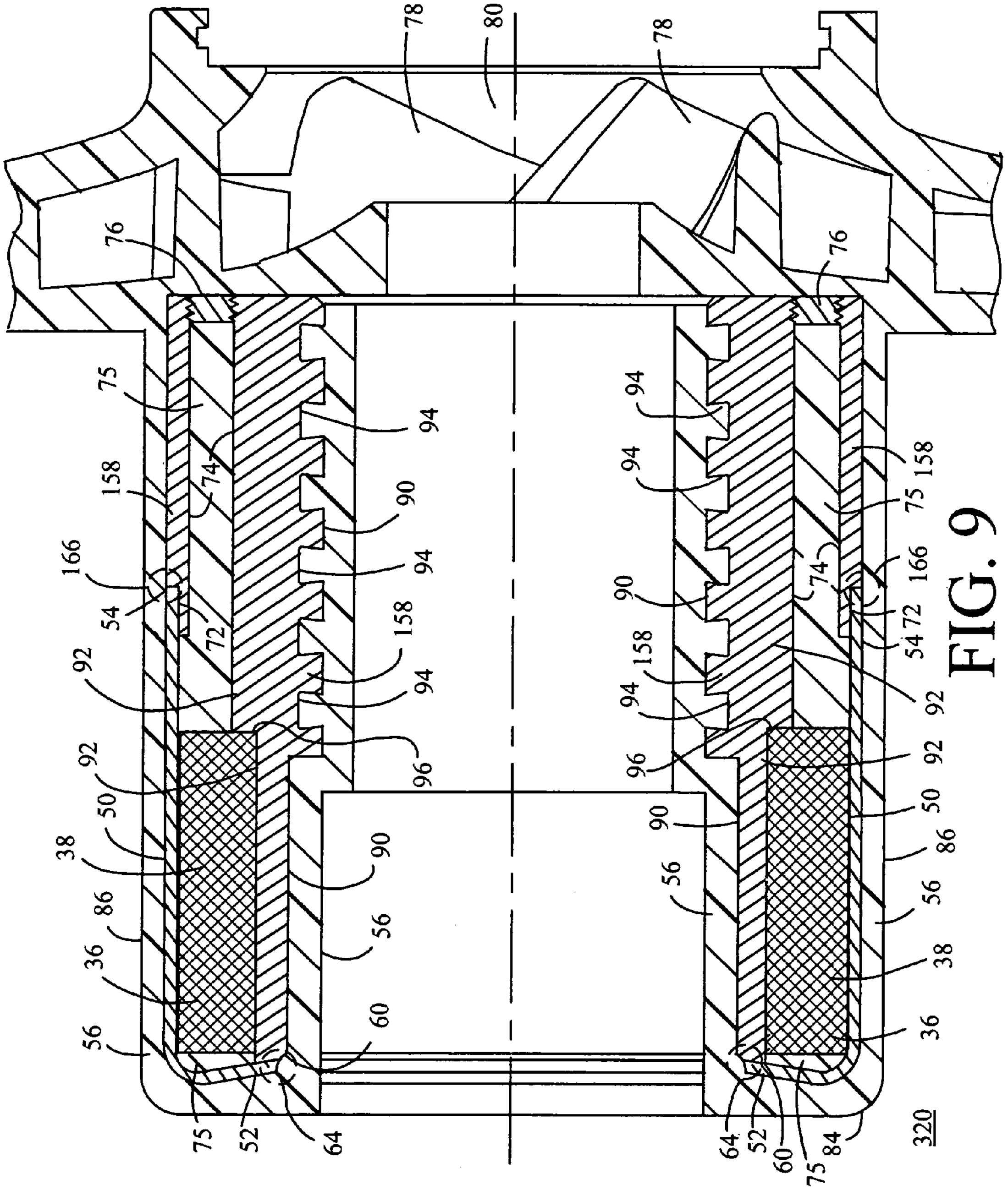
FIG. 9 through FIG. 14, inclusive, are cross sections of various alternate embodiments of impellers.

FIG. 9 shows a cross section of an alternate embodiment of an impeller 320. The impeller 320 of FIG. 9 is similar to the impeller 20 of FIG. 2 except the impeller 320 of FIG. 9 has a unitary core 158 that replaces the core 58 and the sleeve 70 of FIG. 2. Further, the impeller 320 of FIG. 9 does not have the third seam. The first seam is located at a rear portion of the unitary core 158. A secondary seam 166 is located at a central portion of the unitary core 158. The secondary seam 166 refers to a hermetic connection or seal between the inner barrier 50 and the unitary core 158. Like reference numbers in FIG. 2 and FIG. 9 indicate like elements. The impeller 320 of FIG. 9 may be incorporated into any embodiment of the pump described herein.

Figure 10:
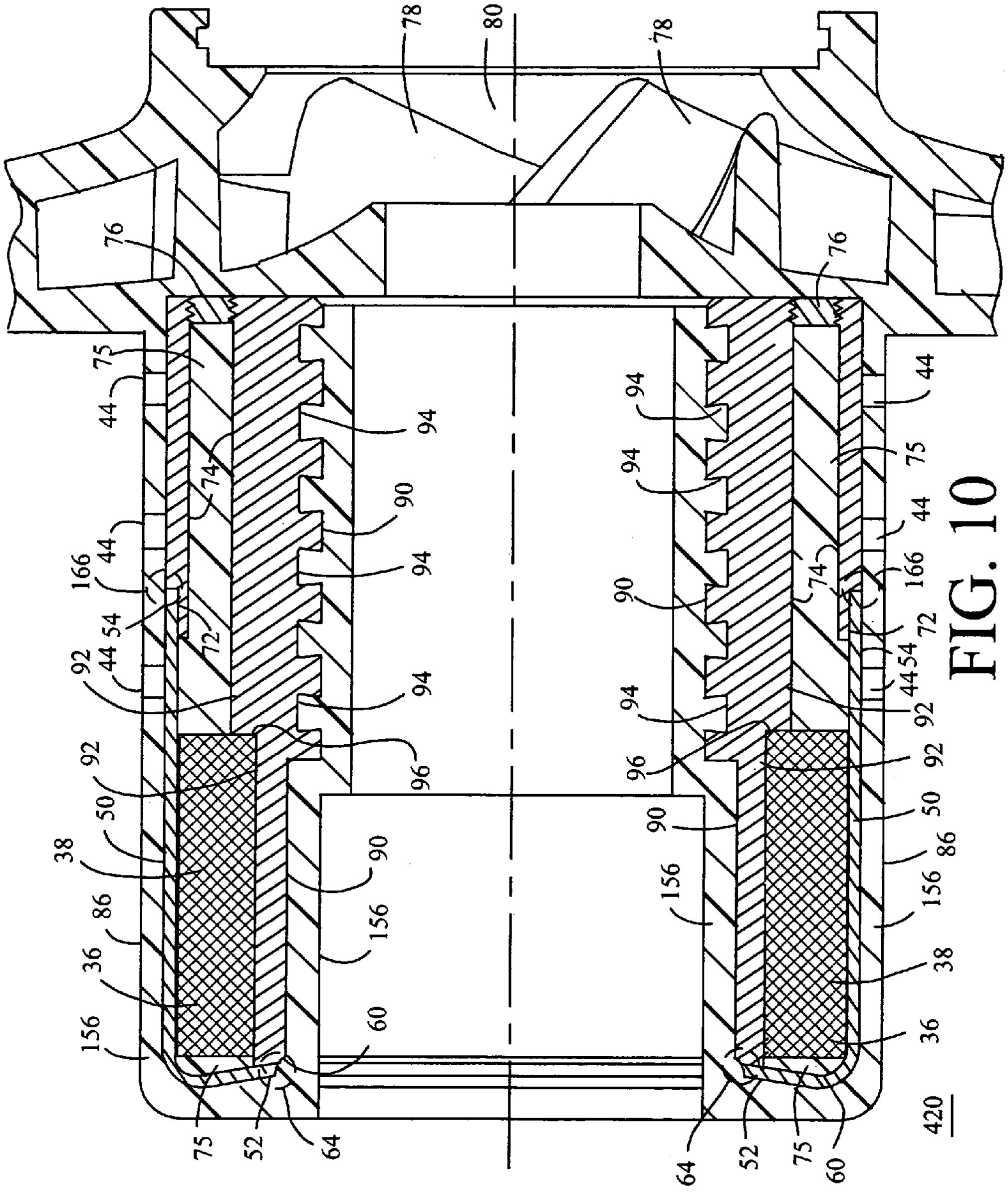

FIG. 10 shows a cross section of another embodiment of the impeller 420. The impeller 420 of FIG. 10 is similar to the impeller 320 of FIG. 9 except the impeller 420 of FIG. 10 features an outer barrier 156 with openings 44. The operation of the openings 44 was previously described in conjunction with FIG. 5. Like reference numbers in FIG. 6 FIG. 9 and FIG. 10 indicate like elements. The impeller 420 may be incorporated into any embodiment of the pump described herein.

Figure 11:
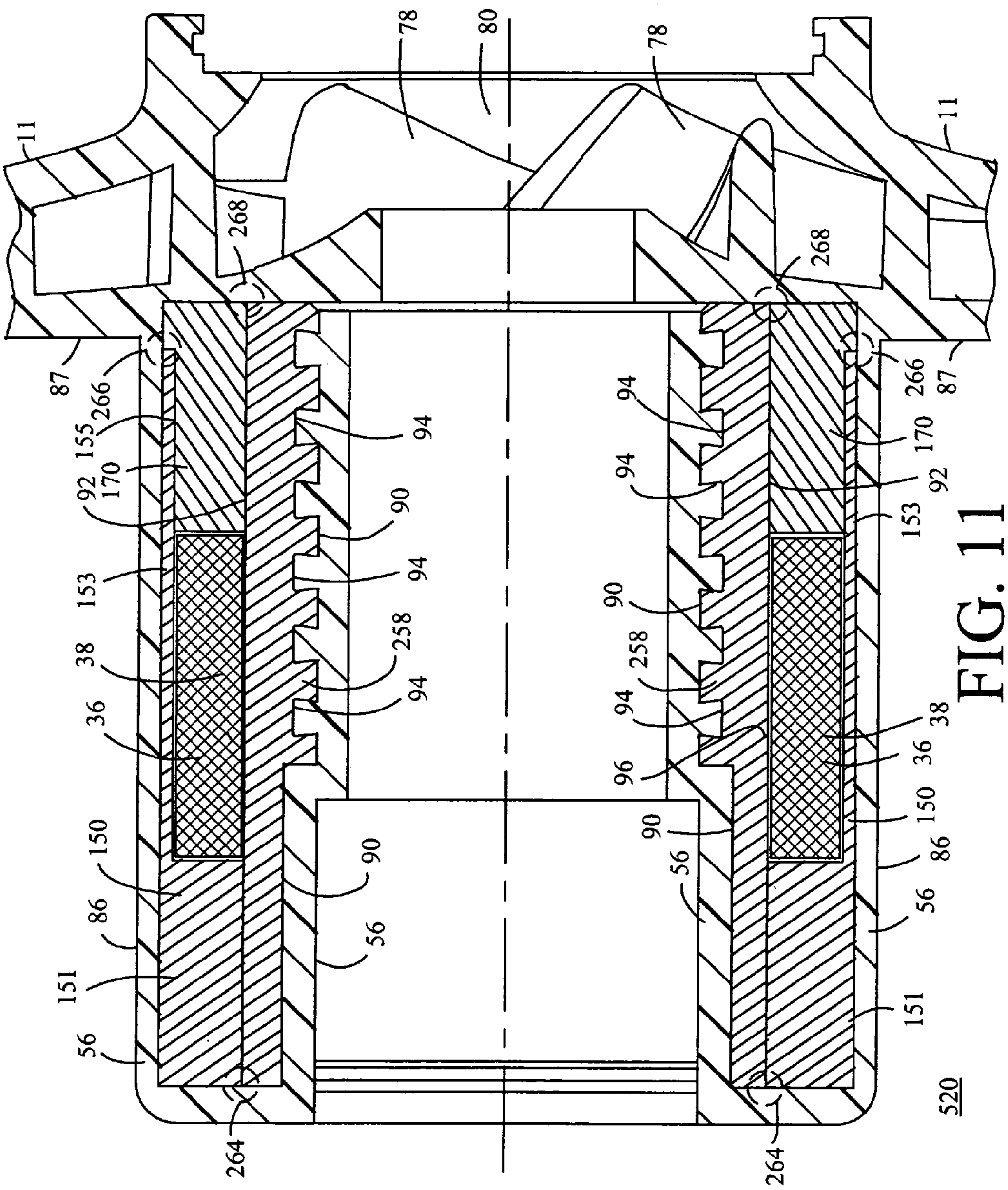

FIG. 11 shows a cross section of an additional embodiment of an impeller 520. The impeller 520 of FIG. 11 is similar to the impeller 20 of FIG. 2 except the impeller 520 features an inner barrier 150 and sleeve 170 of different configuration than the barrier 50 and the sleeve 70. In particular, the inner barrier 150 has a solid annular portion 151 and a generally cylindrical tongue 153. The sleeve 170 is generally annular and has a recess 155 for engaging the cylindrical tongue 153. Like reference numbers in FIG. 2 and FIG. 11 indicate like elements.

A first seam 264 is located at a junction between the core 258 and the inner barrier 150. The core 258 and the inner barrier 150 are hermetically connected or sealed to one another at the first seam 264. A second seam 266 is located at junction between the inner barrier 150 and the sleeve 170. The inner barrier 150 and the sleeve 170 are hermetically connected or sealed to one another at the second seam 266. A third seam is 268 is located at a junction between the sleeve 170 and the core 258. The sleeve 170 and the core 258 are hermetically connected or sealed to one another at the third seam 268. the seams (264, 266 and 268) form a inner protective container about the magnet assembly 38 to protect the magnet assembly 38 from damage from the pumped fluid or any gas within the pumped fluid. The impeller 520 may be incorporated into any embodiment of the pump described herein.

Figure 12:
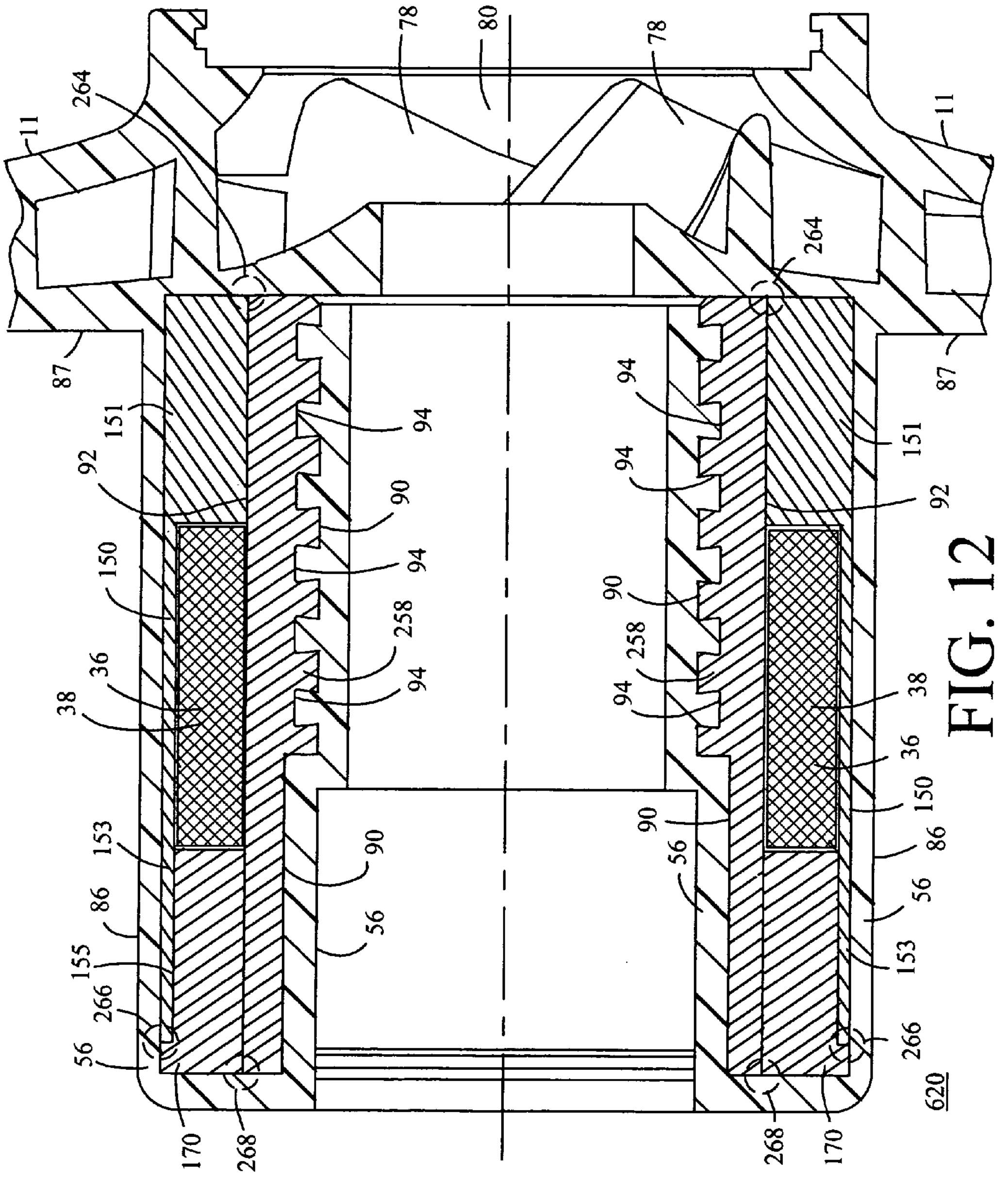

FIG. 12 shows a cross section of an additional embodiment of an impeller 620. The impeller 620 of FIG. 12 is similar to the impeller 520 of FIG. 11 except the inner barrier 150 and the sleeve 170 are flipped end for end. Like reference numbers in FIG. 11 and FIG. 12 indicate like elements. In FIG. 12 the inner barrier 150 is located toward a front of the impeller 620, whereas in FIG. 11 the inner barrier 150 was located toward a rear of the impeller 520. Similarly, in FIG. 12 the sleeve 170 is located toward a rear of the impeller 630, while in FIG. 11 the sleeve 170 is located toward a front of the impeller 520. The three seams (264, 266, and 268) of FIG. 12 hermetically connect the inner barrier 150, the sleeve 170, and the core 258 to protect the magnet assembly from the pumped fluid or any gas within the pumped fluid. The impeller 620 may be incorporated into any embodiment of the pump described herein.

Figure 13:
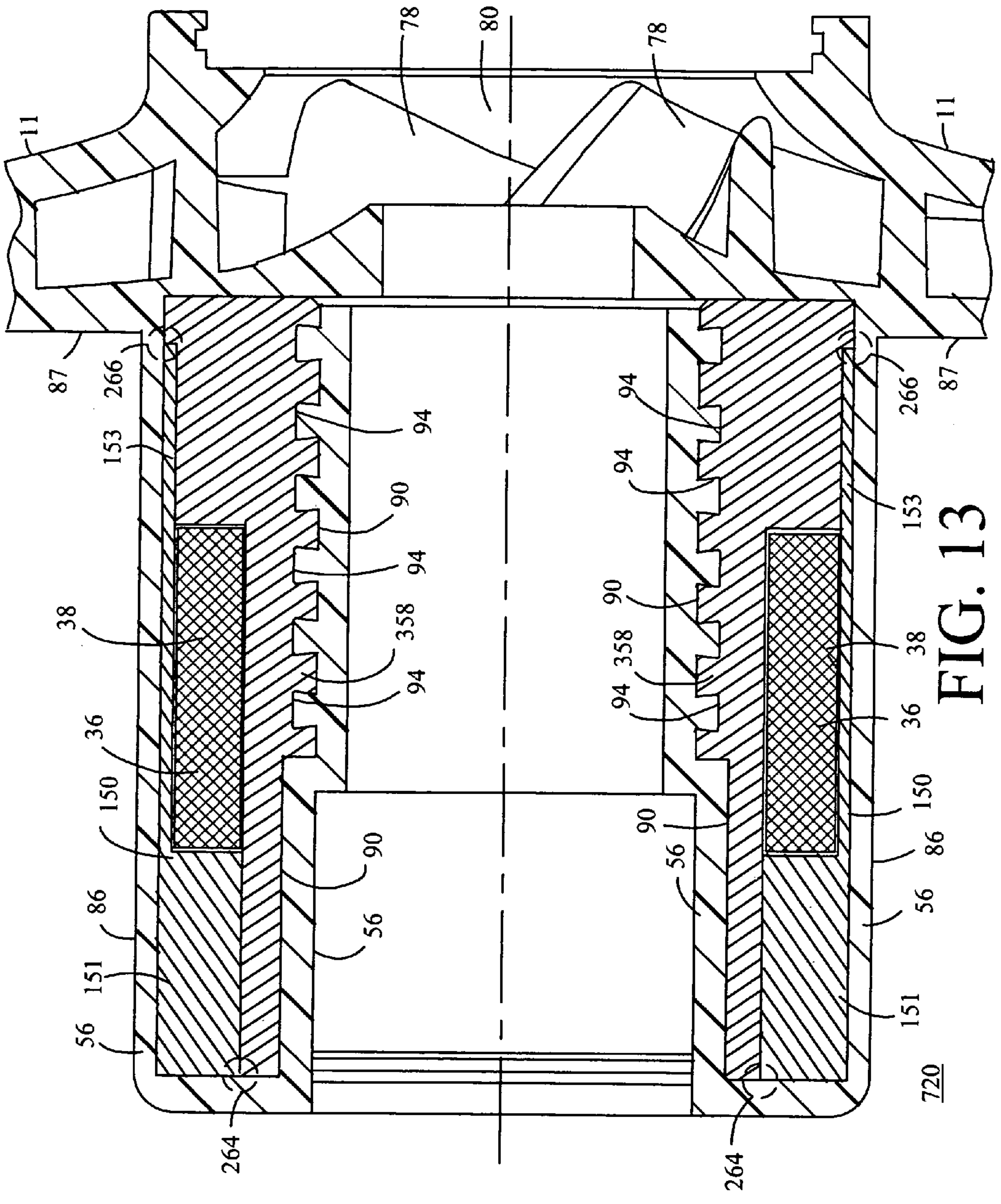

FIG. 13 illustrates a cross section of an alternate embodiment of an impeller 720. The impeller 720 of FIG. 13 is similar to the impeller 520 of FIG. 11 except the impeller 720 of FIG. 13 features a unitary core 358 that replaces the combination of the sleeve 170 and the core 258 of FIG. 11. Further, the impeller of FIG. 13 has two seams, instead of the three seams of FIG. 11. The first seam 264 is disposed between the unitary core 358 and the inner barrier 150. The secondary seam 266 is disposed between the unitary core 358 and the inner barrier 358. The combination of the unitary core 358, the inner barrier 150, the first seam 264 and the secondary seam 266 form an inner containment member for protection of the magnet assembly 38 from the pumped fluid or any gas within the pumped fluid. Like reference numbers represent like elements in FIG. 11 and FIG. 13. The impeller 720 may be incorporated into any embodiment of the pump described herein.

Figure 14:
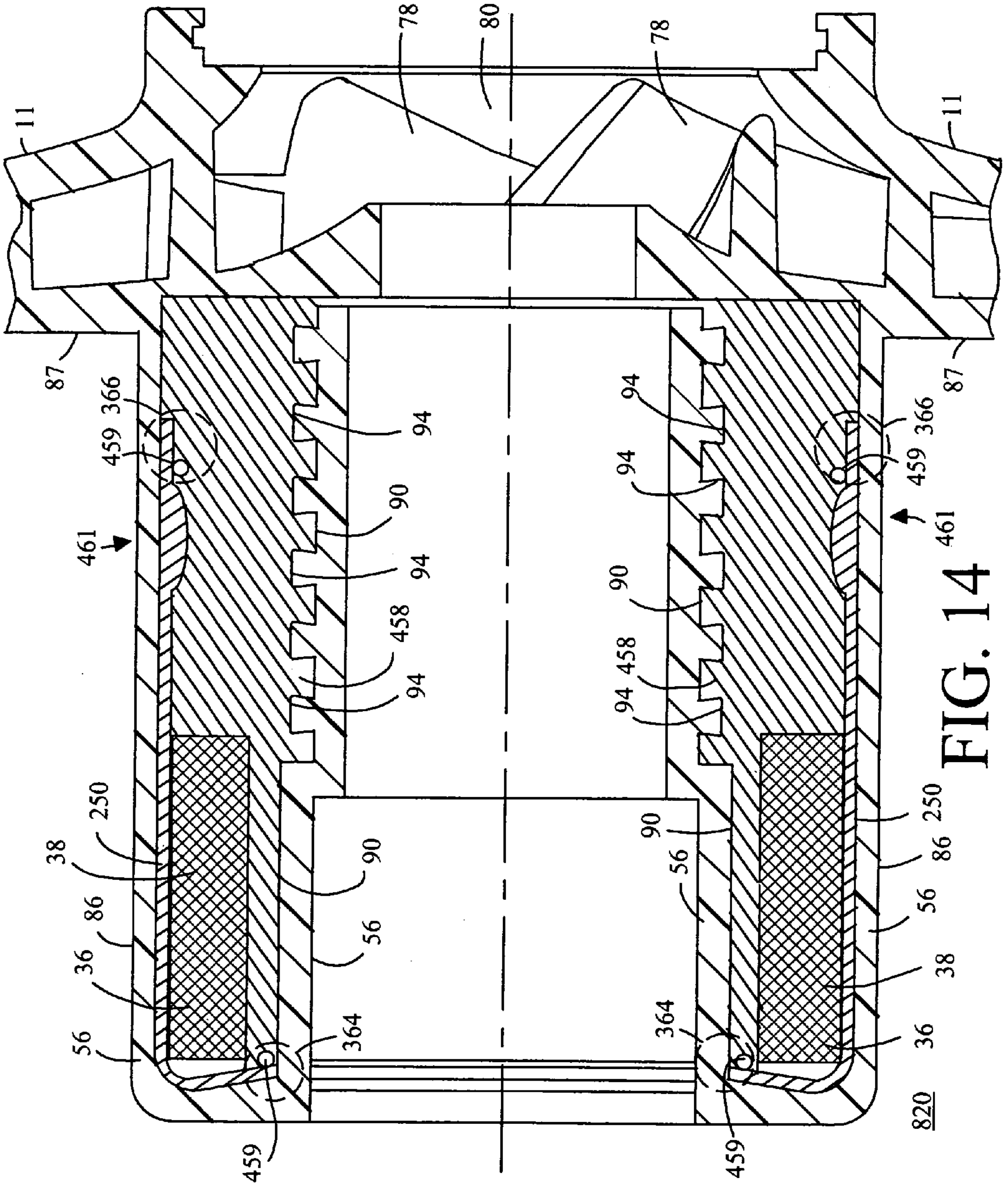

FIG. 14 shows a cross section of an alternate embodiment of an impeller 820. The impeller 820 of FIG. 14 is similar to the impeller 220 of FIG. 8 except the inner barrier 250 and the unitary core 458 have different configurations and are joined by a mechanical connector. Like elements in FIG. 14 and FIG. 8 are indicated by like reference numbers. The inner barrier 250 and the unitary core 458 of FIG. 14 are configured with seals 459 (e.g., elastomeric o-rings) and a mechanical connector 461 (e.g., a snap-fit connector) to provide two sealed interconnections between the inner barrier 250 and the unitary core 458. The inner barrier 250, the unitary core 458, the mechanical connector 461 and the seals 459 cooperate to form an inner protective layer that protects the magnetic assembly 38 from the pumped fluid or gases within the pumped fluid. The impeller 820 of FIG. 14 may be constructed without welding, brazing, soldering or heating of the magnets 36 to avoid thermal damage to the magnets 36 that might otherwise occur if improper fabrication techniques were used. However, welded seams or other generally non-permeable seams of the other embodiments of the impeller are preferred to seals 459 because elastomeric or polymeric seals may be somewhat permeable to certain fluids or gases within the pump. In contrast to most other embodiments disclosed herein, the permeability of the elastomers or polymers of the seals 459 may allow some pumped fluid or gases to traverse an inner protective layer of the configuration of FIG. 14. The impeller 820 of FIG. 14 may be incorporated into any pump disclosed herein.

Figure 15:
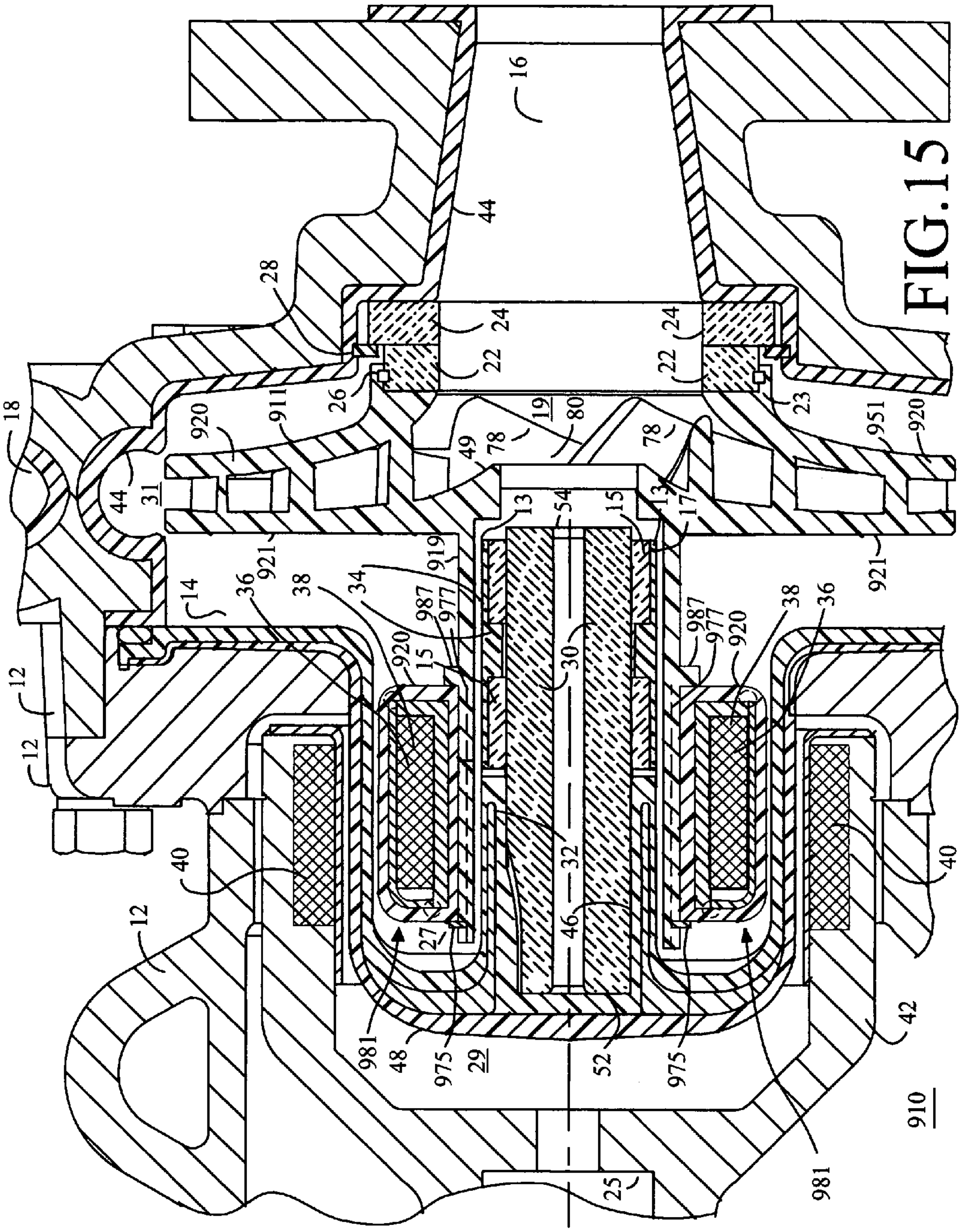
FIG. 15 is cross section of a centrifugal magnetic-drive pump in accordance with yet another embodiment of the invention.

The centrifugal pump 910 of FIG. 15 is similar to the centrifugal pump 10 of FIG. 1 except the impeller 20 of FIG. 1 is replaced by the impeller assembly 920 of FIG. 15. Like reference numbers in FIG. 1 and FIG. 15 indicate like elements.

The impeller assembly 920 of FIG. 15 comprises a rotor 981 and an impeller 951. The impeller assembly 920 is positioned to receive a fluid from the inlet 16 and to exhaust a fluid to the outlet 18. The impeller 951 is mechanically coupled to the rotor 981 to rotate therewith. Mechanically coupled means that the impeller 951 may mechanically engage the rotor 981 (as shown in FIG. 15) or the impeller 951 may be coupled to the rotor 981 via an intervening member (e.g., shaft).

Figure 16:
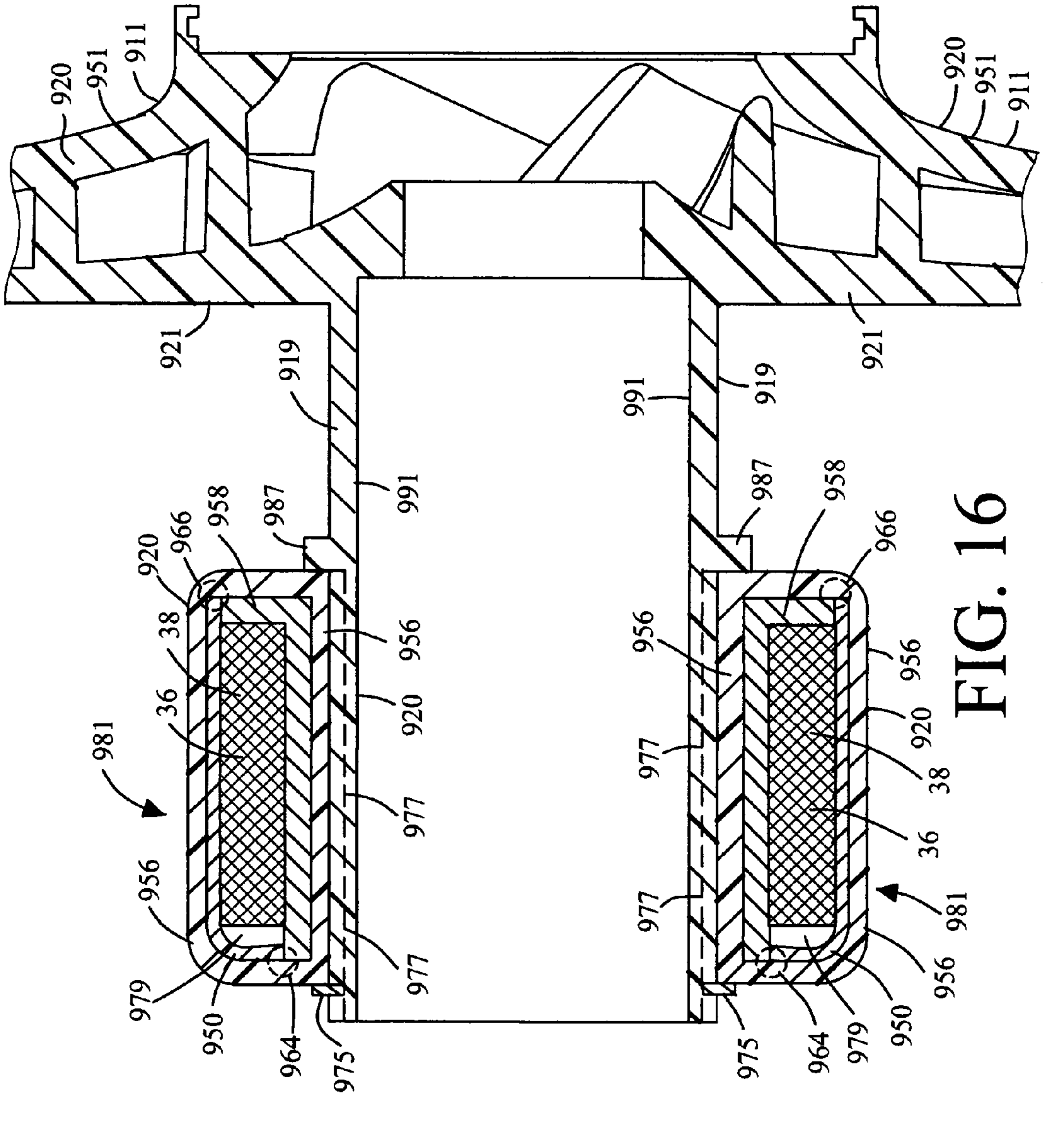
FIG. 16 is a cross-sectional view of a rotor and an impeller of the pump of FIG. 15.

As illustrated by FIG. 15 in conjunction with FIG. 16, the rotor 981 has an inner barrier 950 and an outer barrier 956. The inner barrier 950 covers and hermetically isolates a first magnetic assembly 38 within the rotor 981. The outer barrier 956 overlies the inner barrier 950. In one embodiment, the inner barrier 950 comprises a barrier cylindrical portion and a barrier annular portion associated with one end of the barrier cylindrical portion; the core 958 comprises a core cylindrical portion and a core annular portion associated with one end of the core cylindrical portion; and the barrier cylindrical portion (of the inner barrier 950) has a greater radius than the core cylindrical portion (of the core 958).

In one embodiment, the rotor 981 comprises a core 958 where the inner barrier 950 is hermetically connected to the core 958 at a first seam 964 and a second seam 966. For example, the inner barrier 950 may be welded to the core 958 at the first seam 964 and the second seam 966, which may then be referred to as the first weld seam and the second weld seam. The first seam 964 and the second seam 966 are indicated by the dashed circles in FIG. 16. The first seam 964 may be generally elliptical, circular, or annular about a rotational axis of the rotor 981. The second seam 966 may be generally elliptical, circular, or annular about a rotational axis of the rotor 981. In one configuration, the rotational axis of the rotor coincides with the rotational axis of the impeller 951.

The outer barrier 956 of the rotor 981 encapsulates the inner barrier 950. In one embodiment, the inner barrier 950 is composed of a metallic material and the outer barrier 956 is composed of a polymeric material. For example, the outer barrier 956 is composed of a corrosion-resistant polymer and the inner barrier 950 is composed of corrosion-resistant, metallic material.

A chamber of the rotor 981 is formed by the inner barrier 950 and the core 958. The chamber contains magnets 36 of the first magnetic assembly 38. In one configuration, cavities 979 between or around the magnets 36 are filled with air or an inert gas. In another configuration, cavities 979 between or around the magnets 36 are filled with a filler. For instance, a volume of the cavities 979 around the first magnet assembly 38 may be filled with a corrosion-inhibiting filler (e.g., a potting compound or polymer material).

Although various rotor configurations fall within the scope of the invention, in one embodiment shown in FIG. 15 and FIG. 16 the rotor 981 is generally annular; an interior surface of the rotor 981 has one or more internal splines for engaging one or more corresponding external spline in the impeller 951. Collectively, the internal spline or splines of the rotor 981 and external spline or splines of the impeller 951 may be referred to as splines 977. In general, an internal spline is associated with an interior of a hollow cylindrical member, whereas external spline is associated with an exterior of a corresponding cylindrical member, such that at least one internal spline and at least one external spline interlock with each other or such that a key may be inserted into one external spline and a corresponding internal spline.

The impeller 951 may have a shoulder 987 that forms a stop for the rotor 981 that is slipped or pressed onto the impeller 951 (or the external splines associated therewith). A retaining ring 975 or other retainer secures the rotor 981 to prevent axial movement of the rotor 981 with respect to the impeller 951. As illustrated in FIG. 15 and FIG. 16, the rotor 981 is retained between the shoulder 987 and the retaining ring 975, which may engage a respective groove or slot in the impeller 951.

The impeller 951 has a cylindrical exterior 919 that extends from a back side 921 of the impeller 951. The cylindrical exterior 919 is generally hollow and has a generally cylindrical recess 991. The cylindrical recess 991 is arranged to receive a radial bearing 34. The front side 911 of the impeller 951 has flange 23.

FIG. 16 illustrates an impeller assembly 920 comprising a rotor 981 and an impeller 951 for the centrifugal pump 910 of FIG. 15 or another centrifugal pump. The rotor 981 comprises a first magnetic assembly 38, which includes magnets 36 arranged about a core 958. The core 958 supports the magnetic assembly 38. In one embodiment, the core 958 has a core cylindrical portion and a core annular portion or annular wall extending radially outward from the core cylindrical portion. The inner barrier 950 covers at least part of the first magnetic assembly 38 and hermetically connects to the core 958 at one or more seams (e.g., the first seam 964 and the second seam 966) to provide a seal for a fluid (e.g., a seal against the pumped fluid). An outer barrier 956 overlies the inner barrier 950 and surrounds at least part of the core 958.

The inner barrier 950 is hermetically connected to the core at a first seam 964 and at a second seam 966. The hermetic connection at the first seam 964 and the second seam 966 may be accomplished in accordance with various techniques, which may be applied alternatively or cumulatively. In accordance with a first technique, the inner barrier 950 is welded to the core 958 at the first seam 964 and the second seam 966. The welding of the first technique may apply one or more of the following processes: MIG welding, TIG welding, laser welding, arc welding, spin welding, friction welding, electron-beam welding, or another welding process. The first seam 964 and the second seam 966 of the first technique are composed of a welded metallic material (e.g., a metal or an alloy) that forms a generally nonpermeable or impermeable barrier to the pumped fluid. In accordance with a second technique, the inner barrier 950 is soldered to the core 958 at the first seam 964 and the second seam 966. In accordance with a third technique, the inner barrier 950 is brazed to the core 958 at the first seam 964 and the second seam 966.

The inner barrier 950 is sealed or hermetically connected (e.g., welded) to the core 958 at one or more seams (e.g., a first seam 964 and a second seam 966). Hermetically connected or sealed means that the inner barrier 950 is sealed to another part (e.g., the core 958) of the rotor (e.g., rotor 981) by welding, fusion, soldering, brazing, or another bonding technique to prevent fluid (e.g., the pumped fluid), liquid, gas, or air from traversing the inner barrier 950 into its interior volume. The magnets 36 are disposed in the interior volume between the inner barrier 950 and the core 958. In the configuration of FIG. 16, the outer barrier 956 encapsulates the inner barrier 950 and the first magnetic assembly 38 is protected from the pumped fluid by two protective layers (i.e., the inner barrier 950 and the outer barrier 956). The outer barrier 956 preferably surrounds the inner barrier 950 and at least a portion of the core 958. Although the outer barrier 956 preferably comprises a polymeric layer and the inner barrier 950 comprises a metallic barrier or shield, other materials may be used for the inner barrier 950 and the outer barrier 956.

The hermetic interconnection of the first seam 964 and the second seam 966 may be formed of generally impermeable or generally non-permeable materials (e.g., metals, alloys, or other metallic materials) that prevent the flow or passage of the pumped fluid or any gas within the pumped fluid through the hermetic interconnection. The inner barrier 950, the core 958 or both may be composed of stainless steel, nickel alloys, nickel-chromium alloys, titanium, a titanium alloy, HASTELLOY, INCONEL, or another corrosion-resistant metallic material, alloy or metal. INCONEL is a registered trademark of Huntington Alloys Corporation of West Virginia.

The inner barrier 950 is composed of a metallic material and the outer barrier 956 is composed of a polymeric material. For example, the inner barrier 950 is composed of a corrosion-resistant metallic material and the outer barrier 956 is composed of a corrosion-resistant polymer.

In one embodiment, the outer barrier 956 may be composed of polymer (e.g., a corrosion-resistant polymer). Suitable corrosion-resistant polymers for the outer barrier 956 include epoxy and vinyl ester resin, for example.

In an alternate embodiment, the outer barrier 956 is composed of a polymeric matrix and a reinforcing material distributed within the polymeric matrix. For example, the outer layer may be composed of a polymer composite, a plastic composite, a fiber-reinforced plastic, a fiber-reinforced polymer, carbon fiber-filled polytetrafluoroethylene (PTFE), or another structurally suitable composition. The polymeric matrix may comprise a polymer or plastic, such as PTFE or ethylene tetrafluoroethylene (ETFE). The reinforcing material may comprise carbon fiber, ceramic, metal fiber, glass fiber, or another suitable structural-enhancing filler.

Figure 17:
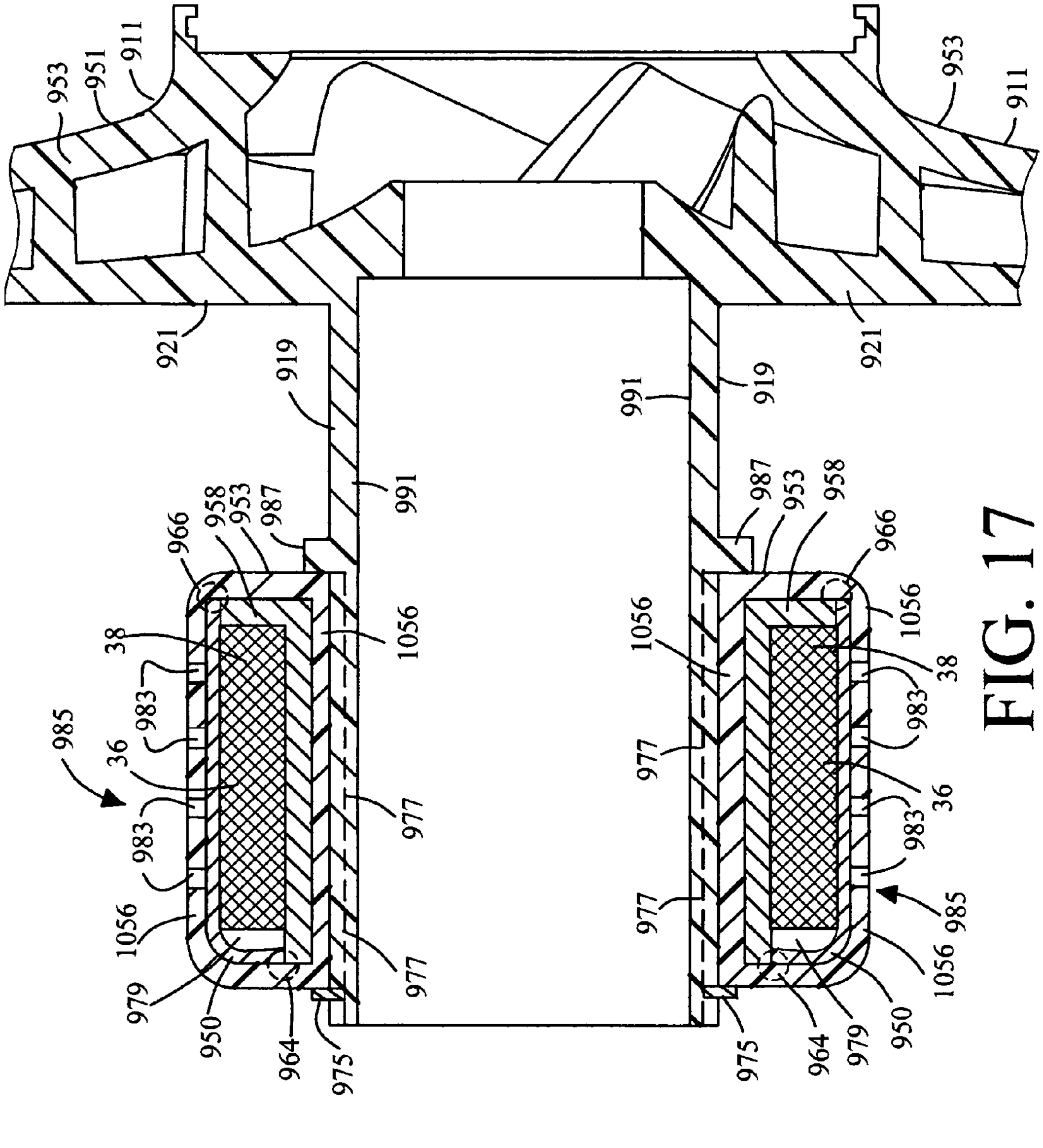
FIG. 17 is a cross-sectional view of an alternate embodiment of the rotor and the impeller of FIG. 16.

The impeller assembly 953 of FIG. 17 is similar to the impeller assembly 920 of FIG. 16 except the impeller assembly 953 of FIG. 17 has radially extending openings 983 in an outer barrier 1056. Like reference numbers in FIG. 16, FIG. 17, and other drawings in this application, indicate like elements. The impeller assembly 953 of FIG. 17 may be substituted for the impeller assembly 920 of FIG. 16 for incorporation into the centrifugal pump 910 of FIG. 15, for instance.

In FIG. 17, the outer barrier 1056 has radially extending openings 983 that extend from an outer surface of the outer barrier 1056 and penetrate through the outer barrier 1056 to expose portions of the inner barrier 950. The outer barrier 1056 of FIG. 17 is substantially similar to or identical to the outer barrier 956 of FIG. 16, except that the outer barrier 1056 has the openings 983 extending through it. The outer barrier 1056 may be composed of a polymeric material (e.g., a corrosion-resistant polymer) that is the same composition as that of the outer barrier 956.

If the outer barrier 1056 is permeable or semi-permeable (e.g., a semi-permeable polymer with respect to the pumped fluid) and not bonded (e.g., not adhesively bonded or becomes delaminated) to the inner barrier 950, any intermediate void (not shown) between the inner barrier 950 and the outer barrier 1056 may fill up with pumped fluid during operation of the pump (e.g., pump 910 incorporating impeller assembly 953). If the rotation of the impeller 951 or rotor 985 is stopped after normal pump operation or if the impeller rotational velocity is suddenly decreased, any pumped fluid in the intermediate void may have a higher pressure than the fluid surrounding the impeller 951 or rotor 985 such that the openings 983 allow the pumped fluid to escape from the intermediate void (e.g., radial gap) between the outer barrier 1056 and the inner barrier 950. Accordingly, the openings 983 facilitate relieving any material hydraulic pressure present within the intermediate void to reduce or eliminate bulging or swelling of the outer barrier 1056 of the rotor 985 that might otherwise occur during certain operational conditions. It is understood that the bulging or swelling of the outer barrier 1056 may cause the rotor 985 to make unwanted contact with the interior of the containment member 48, which can lead to failure of the containment member 48, the rotor 985, the impeller 951, or even the drive motor of the pump (e.g., pump 910).

Figure 18:
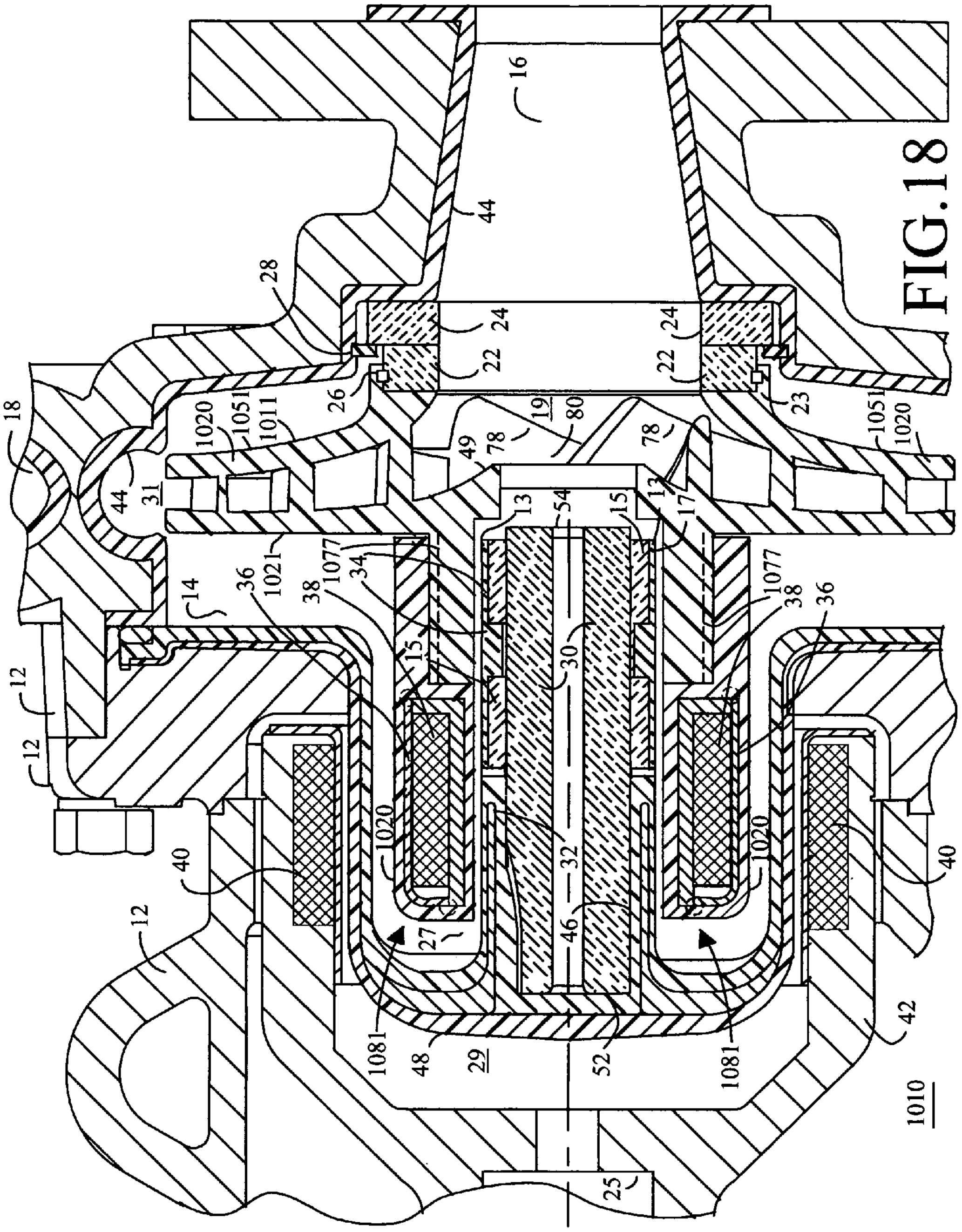
FIG. 18 is cross section of a centrifugal magnetic-drive pump in accordance with still another embodiment of the invention.

The centrifugal pump 1010 of FIG. 18 is similar to the centrifugal pump 10 of FIG. 1 except the impeller 20 of FIG. 1 is replaced by the impeller assembly 1020 of FIG. 18. Like reference numbers in FIG. 1, FIG. 16, FIG. 18, and other drawings in this application, indicate like elements.

The impeller assembly 1020 of FIG. 18 comprises a rotor 1081 and an impeller 1051. As illustrated by FIG. 18 in conjunction with FIG. 19, the rotor 1081 has an inner barrier 950 and an outer barrier 1156. The inner barrier 950 covers and hermetically isolates a first magnetic assembly 38 within the rotor 1081. The outer barrier 1156 overlies the inner barrier 950. The impeller assembly 1020 is positioned to receive a fluid from the inlet 16 and to exhaust a fluid to the outlet 18. The impeller 1051 is mechanically coupled to the rotor 1081 to rotate therewith. For example, the impeller 1051 mechanically engages the rotor 1081 for rotation therewith at splines 1077.

In one embodiment, the rotor 1081 comprises a core 958 where the inner barrier 950 is hermetically connected to the core 958 at a first seam 964 and a second seam 966. For example, the inner barrier 950 may be welded to the core 958 at a first seam 964 and a second seam 966, which may then be referred to as the first weld seam and the second weld seam, respectively. The outer barrier 1156 encapsulates the inner barrier 950. The inner barrier 950 is composed of a metallic material and the outer barrier 1156 is composed of a polymeric material. For instance, the outer barrier 1156 is composed of a corrosion-resistant polymer and the inner barrier 950 is composed of corrosion-resistant, metallic material. The outer barrier 1156 of FIG. 19 may be composed of the same material or substantially the same material as outer barrier 956 of FIG. 16.

Although various rotor configurations fall within the scope of the invention, in one embodiment shown in FIG. 18 the rotor 1081 is generally annular; an interior surface of the rotor 1081 has internal splines for engaging corresponding external splines in the impeller 1051. Collectively, the internal splines of the rotor 1081 and external splines of the impeller 1051 may be referred to as splines 1077.

Figure 19:
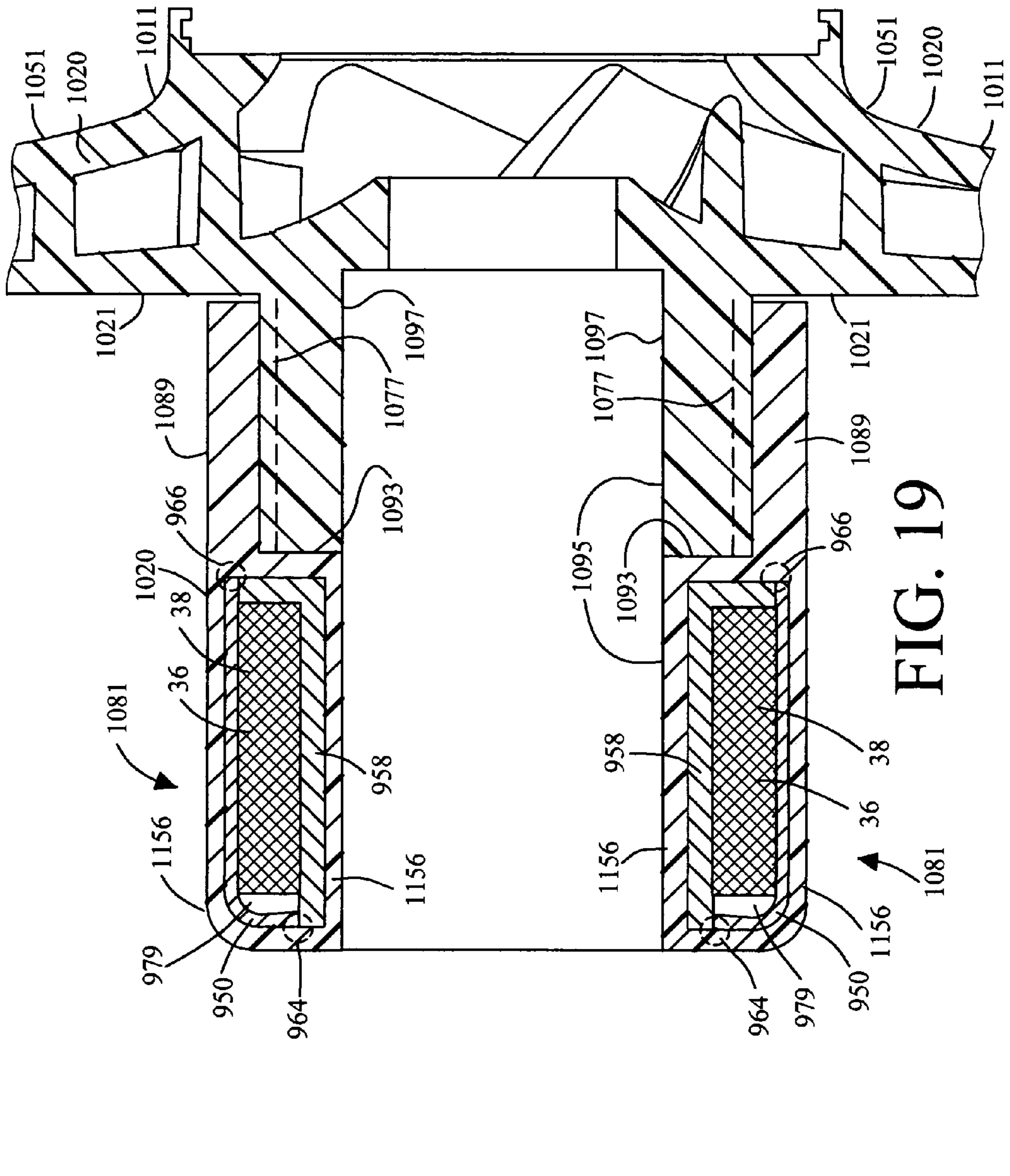
FIG. 19 is a cross-sectional view of a rotor and an impeller of the pump of FIG. 18.

FIG. 19 illustrates an impeller assembly 1020 comprising the rotor 1081 and the impeller 1051 for the centrifugal pump 1010 of FIG. 18 or another centrifugal pump. Like reference numbers in FIG. 16, FIG. 18, and FIG. 19 indicate like elements. The rotor 1081 comprises a first magnetic assembly 38, which includes magnets 36 arranged about a core 958. The core 958 supports the magnetic assembly 38. The rotor 1081 comprises a rotor coupling portion 1089 at one end of the rotor 1081. In one embodiment, the rotor coupling portion 1089 comprises a generally annular extension that provides a recess 1093. Further, the impeller 1051 comprises an impeller coupling portion 1097 on a rear side 1021 of the impeller 1051 opposite a front side 1011 of the impeller 1051.

The rotor coupling portion 1089 engages the impeller coupling portion 1097 in a press fit, a slip fit, or another mechanical interconnection (e.g., stainless steel fastener) in accordance with various alternate configurations, among other possibilities. In a first illustrative configuration, the rotor coupling portion 1089 comprises internal splines; the impeller coupling portion 1097 comprises corresponding external splines for engaging the internal splines as a press fit. A press fit may refer to mechanical interference between adjacent parts that interlock when exposed to a sufficient pressure or compressive force. In a second illustrative configuration, the rotor coupling portion 1089 comprises internal splines; the impeller coupling portion 1097 comprises corresponding external splines for engaging the internal splines as a slip fit, where a fastener secures the rotor coupling portion 1089 to the impeller coupling portion 1097 to prevent relative axial movement thereof. In a third configuration, the rotor coupling portion 1089 comprises tapered internal splines; the impeller coupling portion 1097 comprises corresponding tapered external splines for engaging the tapered internal splines. In a fourth configuration (not shown), the rotor coupling portion 1089 and the impeller coupling portion 1097 may comprise generally hollow cylindrical members that are coaxially and telescopically aligned with respect to each other. Further, the hollow cylindrical members (of the fourth configuration) are coupled for rotation together by a key placed in a mutually aligned groove in the cylindrical members. For the fourth configuration, a fastener may pass radially through a threaded bore in the rotor coupling portion 1089 such that an end of the fastener frictionally contacts the impeller coupling portion 1097. In any configuration described above, if the rotor coupling portion 1089 is properly aligned with the impeller coupling portion 1097, the rotor 1081 and the impeller 1051 collectively define a generally cylindrical recess 1095 for receiving the radial bearing 34 of the pump 1010.

Figure 20:
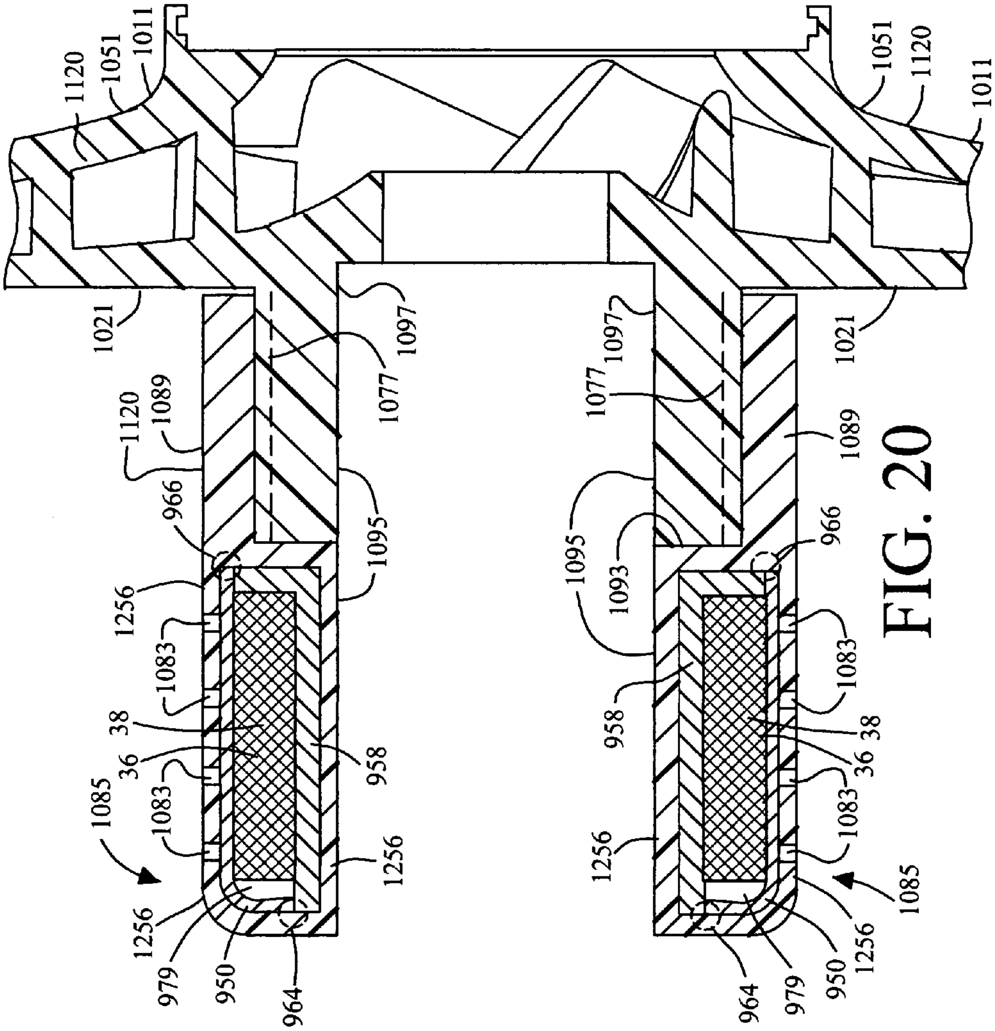
FIG. 20 is a cross-sectional view of an alternate embodiment of the rotor and impeller of FIG. 19.

The impeller assembly 1120 of FIG. 20 is similar to the impeller assembly 1020 of FIG. 19 except the impeller assembly 1120 of FIG. 20 has an outer barrier 1256 with openings 1083 therein. The outer barrier 1256 has radially extending openings 1083 that extend from an outer surface of the outer barrier 1256 and penetrate through the outer barrier 1256 to the inner barrier 950. The outer barrier 1256 of FIG. 19 may be composed of the same material or substantially similar material as the outer barrier 1156. Like reference numbers in FIG. 16, FIG. 19 and FIG. 20, and other drawings in this application, indicate like elements.

The impeller assembly 1120 comprises a rotor 1085 and an impeller 1051. The impeller assembly 1120 includes a generally cylindrical recess for receiving a radial bearing 34 of a pump. Either the impeller assembly 1020 of FIG. 19 or the impeller assembly 1120 of FIG. 20 may be incorporated into the centrifugal pump 1010 of FIG. 18 or another centrifugal pump.

In FIGS. 2, 3, 6, 8, 9, 10, 11, 12, 13, 16, 17, 19 and 20, the general location of various seams (e.g., the first seam, the second seam and the third seam) is indicated by dashed circles. Although the boundaries between adjoining components (e.g., inner barrier 50 and core 58) of the seams are show as lines in the foregoing figures, in practice the boundaries may become merged by heat, welding, fusion, or other techniques for joining the adjoining components. It is understood that the figures are provided for illustrative purposes and do not show fused or merged seams to avoid confusion. Nevertheless, any of the seams in any of the drawings may be merged or fused and fall within the scope of the invention.

The above detailed description is provided in sufficient detail to allow one of ordinary skill in the art to make and use the invention. The above detailed description describes several embodiments of the invention. The invention may have additional physical variations or additional embodiments that are encompassed within the scope of the claims. For example, the filler 75, the cap 76 and the channels 94 may be deleted from any of the embodiments disclosed herein while falling within the scope of the claims. Further, the first magnetic assembly 38 may be formed of one or more magnets, because one magnet can be magnetized with a series of different magnetic poles (e.g., multiple north and south poles). Accordingly, any narrow description of the elements in the specification should be used for general guidance rather than to restrict the broader descriptions of the elements in the following claims.

We claim:

1. A centrifugal pump comprising:

a housing having a housing cavity, an inlet, and an outlet;

a shaft located within the housing cavity;

a radial bearing coaxially surrounding said shaft, the shaft and the radial bearing being rotatable with respect to one another; and a rotor having an inner barrier covering and hermetically isolating a magnetic assembly within the rotor, an outer barrier overlying the inner barrier, the inner barrier composed of a metallic material and the outer barrier composed of a polymeric material;

an impeller positioned to receive a fluid from the inlet and to exhaust a fluid to the outlet, the impeller mechanically coupled to the rotor to rotate therewith.

2. The centrifugal pump according to claim 1 wherein the rotor comprises a core, the inner barrier being hermetically connected to the core at a first seam and a second seam.

3. The centrifugal pump according to claim 1 wherein the rotor comprises a core, the inner barrier being welded to the core at a first weld seam and a second weld seam.

4. The centrifugal pump according to claim 1 wherein the outer barrier encapsulates the inner barrier, the outer barrier composed of a corrosion-resistant polymer and the inner barrier composed of corrosion-resistant, metallic material.

5. The centrifugal pump according to claim 1 wherein a chamber is formed by the inner barrier and the core, the chamber containing magnets of the magnetic assembly, cavities between the magnets being filled with a filler.

6. The centrifugal pump according to claim 5 wherein a volume of the cavities around the magnet assembly is filled with a corrosion-inhibiting filler.

7. The centrifugal pump according to claim 1 wherein the outer barrier has radially extending openings that extend from an outer surface of the outer barrier and penetrate through the outer barrier.

8. The centrifugal pump according to claim 1 wherein the rotor comprises a rotor coupling portion at one end of the rotor; the impeller comprising an impeller coupling portion on a rear side of the impeller, the rotor coupling portion engaging the impeller coupling portion.

9. The centrifugal pump according to claim 8 wherein the rotor coupling portion comprises internal splines; the impeller coupling portion comprising external splines for engaging the internal splines.

10. A centrifugal pump comprising:

a housing having a housing cavity, an inlet, and an outlet;

a shaft located within the housing cavity;

a radial bearing coaxially surrounding said shaft, the shaft and the radial bearing being rotatable with respect to one another; and a rotor having an inner barrier covering and hermetically isolating a magnetic assembly within the rotor, an outer barrier overlying the inner barrier, the inner barrier composed of a metallic material and the outer barrier composed of a polymeric material;

an impeller positioned to receive a fluid from the inlet and to exhaust a fluid to the outlet, the impeller mechanically coupled to the rotor to rotate therewith, wherein the rotor is generally annular, an interior surface having internal splines for engaging corresponding external splines in the impeller.

11. The rotor according to claim 10 further comprising a retainer to prevent axial movement of the rotor with respect to the impeller.

12. The rotor according to claim 10 wherein the outer barrier has radially extending openings that extend from an outer surface of the outer barrier and penetrate through the outer barrier to expose portions of the inner barrier.

13. The rotor according to claim 10 wherein the splines are located between a rear side of the impeller and a magnet assembly.

14. A rotor for a centrifugal pump comprising:

a magnetic assembly comprising a plurality of magnets;

a core for supporting the magnetic assembly;

an inner barrier covering at least part of the magnetic assembly and hermetically connected to the core at one or more seams to provide a seal for a fluid; and an outer barrier overlying the inner barrier and surrounding at least part of the core, wherein the inner barrier is composed of a metallic material and wherein the outer barrier is composed of a polymeric material.

15. The rotor according to claim 14 wherein the inner barrier is hermetically connected to the core at a first seam and at a second seam.

16. The rotor according to claim 14 wherein the inner barrier is welded to the core at a first weld seam and a second weld seam.

17. The rotor according to claim 14 wherein the outer barrier encapsulates the inner barrier, the inner barrier composed of a corrosion-resistant polymer and the outer barrier composed of a corrosion-resistant metallic material.

18. The rotor according to claim 14 wherein a chamber is formed between the inner barrier and the core, the magnetic assembly having magnets disposed within the chamber, cavities between the magnets filled with a filler.

19. The rotor according to claim 14 wherein the outer barrier has radially extending holes that extend from an outer surface of the outer barrier and penetrate through the outer barrier.

* * * * *